(12) United States Patent
Bjerre et al.

(10) Patent No.: US 7,752,142 B2
(45) Date of Patent: *Jul. 6, 2010

(54) COMMON CARRIER SYSTEM

(75) Inventors: Poul Bjerre, Carinaparken (DK); Thomas M. Eskesen, Sdr. Strandvej (DK); Michael Schutt, Morris Plains, NJ (US)

(73) Assignee: INTTRA, Inc., Parsippany, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,354

(22) Filed: Nov. 22, 2004

(65) Prior Publication Data

US 2005/0091089 A1    Apr. 28, 2005

Related U.S. Application Data

(62) Division of application No. 09/973,082, filed on Oct. 10, 2001.

(60) Provisional application No. 60/238,454, filed on Oct. 10, 2000.

(51) Int. Cl.
*G06Q 30/00* (2006.01)

(52) U.S. Cl. ...................... 705/333; 705/336

(58) Field of Classification Search ............ 705/1
See application file for complete search history.

(56) References Cited

U.S. PATENT DOCUMENTS

| | | |
|---|---|---|
| 5,311,425 A | 5/1994 | Inada |
| 5,631,827 A | 5/1997 | Nicholls et al. |
| 5,712,789 A | 1/1998 | Radican |
| 5,787,400 A | 7/1998 | Weber |
| 5,835,716 A | 11/1998 | Hunt et al. |
| 5,910,896 A | 6/1999 | Hahn-Carlson |
| 5,959,568 A | 9/1999 | Woolley |
| 5,995,950 A | 11/1999 | Barns-Slavin et al. |
| 6,016,484 A | 1/2000 | Williams et al. |
| 6,018,725 A | 1/2000 | Boucher et al. |
| 6,035,289 A | 3/2000 | Chou et al. |
| 6,035,291 A | 3/2000 | Thiel |
| 6,047,264 A * | 4/2000 | Fisher et al. ............... 705/26 |
| 6,061,667 A | 5/2000 | Danford-Klein et al. .... 705/400 |
| 6,064,981 A | 5/2000 | Barni et al. |

(Continued)

FOREIGN PATENT DOCUMENTS

CN    1213915 A    4/1999

(Continued)

OTHER PUBLICATIONS

Hillebrand, "From2.com Gives International E-Commerce A Hand", E-Commerce Times, Oct. 2000.

(Continued)

*Primary Examiner*—Jamisue A Plucinski
(74) *Attorney, Agent, or Firm*—Banner & Witcoff, Ltd

(57) ABSTRACT

An on-line system and method for buyers and sellers of international container transportation services is disclosed. Specifically, the system offers importing and exporting customers the opportunity to request and select specific service patterns offered by participating carriers in the booking of full container shipments. The system includes user interfaces that allow a shipper to track and trace containers across multiple carriers and an event notifications system, which notifies the user when an event has or has not occurred.

13 Claims, 22 Drawing Sheets

U.S. PATENT DOCUMENTS

| | | | |
|---|---|---|---|
| 6,078,889 A | 6/2000 | Boucher et al. ............... 705/1 |
| 6,088,648 A | 7/2000 | Shah et al. |
| 6,233,568 B1 | 5/2001 | Kara ........................ 705/410 |
| 6,240,362 B1* | 5/2001 | Gaspard, II ................ 701/209 |
| 6,263,317 B1 | 7/2001 | Sharp et al. ................... 705/26 |
| 6,285,916 B1 | 9/2001 | Kadaba et al. |
| 6,321,214 B1 | 11/2001 | Thiel ........................ 705/408 |
| 6,463,419 B1 | 10/2002 | Kluss ......................... 705/26 |
| 6,463,420 B1 | 10/2002 | Guidice et al. |
| 6,539,360 B1 | 3/2003 | Kadaba ...................... 705/28 |
| 6,625,584 B1* | 9/2003 | Bains et al. ................. 705/400 |
| 6,772,130 B1 | 8/2004 | Karbowski et al. |
| 6,865,516 B1 | 3/2005 | Richardson |
| 6,970,825 B1 | 11/2005 | Altendahl et al. |
| 6,976,007 B1 | 12/2005 | Boucher et al. |
| 7,117,170 B1 | 10/2006 | Bennett et al. |
| 2002/0123911 A1 | 9/2002 | Bjerre et al. |
| 2002/0178023 A1 | 11/2002 | Bjerre et al. |
| 2003/0236739 A1* | 12/2003 | Borgeson et al. ............. 705/37 |
| 2005/0091090 A1 | 4/2005 | Bjerre et al. |
| 2005/0091091 A1 | 4/2005 | Bjerre et al. |
| 2005/0246359 A1 | 11/2005 | Robbins |
| 2007/0073551 A1* | 3/2007 | Williams et al. ............... 705/1 |
| 2007/0299686 A1* | 12/2007 | Hu et al. ...................... 705/1 |

FOREIGN PATENT DOCUMENTS

| | | |
|---|---|---|
| JP | 6-208577 A | 7/1994 |
| JP | 7-230516 A | 8/1995 |
| JP | 9-231038 A | 9/1997 |
| JP | 9-305672 A | 11/1997 |
| JP | 10-097584 A | 4/1998 |
| JP | 11-031186 A | 2/1999 |
| JP | 11-193114 A | 7/1999 |
| JP | 11-250155 A | 9/1999 |
| JP | 2000-123221 A | 4/2000 |
| JP | 2001-525775 | 12/2001 |
| NZ | 236258 | 9/1996 |
| NZ | 272998 | 9/1996 |
| NZ | 280867 | 1/1999 |
| WO | 96-13015 A2 | 5/1996 |
| WO | WO 98/21678 | 5/1998 |
| WO | WO 00/48053 | 8/2000 |
| WO | 01-46833 A2 | 6/2001 |
| WO | 01-67337 A1 | 9/2001 |

OTHER PUBLICATIONS

Leonardi, "iShip Announces New E-Commerce Shipping Service", E-Commerce Times, Oct. 2000.

Enos, "Ariba and Descartes Link B2B Infrastructures", E-Commerce Times, Oct. 2000.

FreightDesk.com, About Us Brochure, Oct. 2000.

International Preliminary Examination Report in PCT Application No. PCT/US1/31470 dated Apr. 20, 2004.

Examination Report in Application No. NZ 525248 dated Aug. 16, 2004.

Examination Report in Application No. NZ 525248 dated Jan. 10, 2006.

Examination Report in Application No. NZ 525248 dated Mar. 27, 2006.

First Examination Report in Patent Application No. IN 0616/DELNP/2003 dated Jul. 27, 2006.

Office Action in EP01 981 420.1 dated Feb. 7, 2008.

Examiner's First Report on Australian Patent Application No. 2002213062 dated Apr. 12, 2006.

Examiner's Second Report on Australian Patent Application No. 2002213062 dated Apr. 24, 2007.

Notice of Grounds for Rejection in Korean Application No. 2003-7005089 dated Oct. 18, 2007.

Notice of Grounds for Rejection in Korean Application No. 2003-7005089 dated Jun. 4, 2008.

Notice for Reason for Refusal in Japanese Application No. 2002-535040 dispatched Mar. 27, 2007.

Notification of the First Office Action in Chinese Application No. 01818821.4 dated Jul. 1, 2005.

Notification of the Second Office Action in Chinese Application No. 01818821.4 dated Aug. 14, 2009.

Examiner's First Report on Australian Patent Application No. 2008200156 dated Feb. 2, 2009.

Notice of Grounds for Rejection in Korean Patent Application No. 10-2008-7019670 dated Nov. 6, 2008.

Notice of Grounds for Rejection in Korean Patent Application No. 10-2008-7019670 dated Jul. 31, 2009.

Notice of Grounds for Rejection in Korean Patent Application No. 10-2008-7019671 dated Nov. 6, 2008.

Notice of Grounds for Rejection in Korean Patent Application No. 10-2008-7019671 dated Jul. 31, 2009.

Notice of Grounds for Rejection in KR Application No. 10-2008-7019672 dated Nov. 6, 2008.

Notice of Grounds for Rejection in KR Application No. 10-2008-7019672 dated Jul. 31, 2009.

Notice of Reasons for Refusal in Japanese Application No. 2007-169667 dated Feb. 23, 2010.

* cited by examiner

One Click Tracking — 436

John Smith Exports International

| Booking | Track & Trace | Geography | Account Setup |

New Booking Request carrier selection
For Contract Reference, please enter either the Service Contract, Quote Number, or Tariff Number/Tariff Line Item. To enter more than one PO# or other reference number, please follow the arrows link below.

Carrier ( * ) [CMA CGM] — 407
Contract Reference [CMA001] — 408
PO Number [ ] — 409  Additional Reference Numbers — 410
— 401 cargo Information
Please check the HazMat box if your cargo contains hazardous materials.

Description ( * ) [Polyester pellets] — 411  Total Cargo Wgt ( * ) [38000] — 412 [lbs]  Hazmat — 413
— 402 container information
If any of your containers require temperature control, please check the temperature control box to submit additional information.

Quantity ( * ) [2] — 414  Type / Size ( * ) [40 General Purpose] — 415
Quantity [ ]  Type / Size [ ]
Quantity [ ]  Type / Size [ ]
Quantity [ ]  Type / Size [ ]
Temperature Control — 416
— 403 routing information
Below please enter Place of Origin, Place of Destination, and either Requested Date of Origin or Requested Vessel Voyage.

Place of Origin ( * ) [ ] Search — 425
Requested Date at Origin [01012001] (DDMMYYYY)
Requested Vessel Voyage [ ] [ ]
Place of Destination ( * ) [ ] Search — 426
Load Port [ ] Search — 427  Discharge Port [ ] Search — 428
Door Pickup: — 423  — 421  Door Delivery: — 424  — 422
— 404

FIG. 4a

| booking parties |
|---|
| Please enter information about the different Booking Parties, Shipper and Export Forwarder |

Shipper — 429a

Name [_____] Search — 434a

Check if the Shipper's name entered is an existing system party. ☐

I am the Shipper ☑

Address — 430a

Reference — 431a
Contact — 432a
Telephone — 433a

405a

ExportForwarder — 429b

Name [_____] Search — 434b

Check if the ExportForwarder's name entered is an existing party. ☑

I am the ExportForwarder ☐

Address — 430b

Reference — 431b
Contact — 432b
Telephone — 433b

| Consignee | |
|---|---|
| Name [____429c____] [Search] ~434c | |
| Check if the Consignee's name entered is an existing party. | ☐ |
| I am the Consignee | ☐ |

| Address | [____430c____] |
|---|---|
| | [_____] |
| | [_____] |
| | [_____] |
| | [_____] |
| | [_____] |
| Reference | [____]~431c |
| Contact | [____]~432c |
| Telephone | [____]~433c |

―405c

| ContractParty | |
|---|---|
| Name [____429d____] [Search] ~434d | |
| Check if the ContractParty's name entered is an existing party. | ☐ |
| I am the ContractParty | ☐ |

| Address | [____430d____] |
|---|---|
| | [_____] |
| | [_____] |
| | [_____] |
| | [_____] |
| | [_____] |
| Reference | [____]~431d |
| Contact | [____]~432d |
| Telephone | [____]~433d |

―405d additional information
[____435____]

―406

[Book Now] [Save As Draft] [Save As Template] [_____]
  436        437           438

Figures 9A, 9B, 10A, 10B:
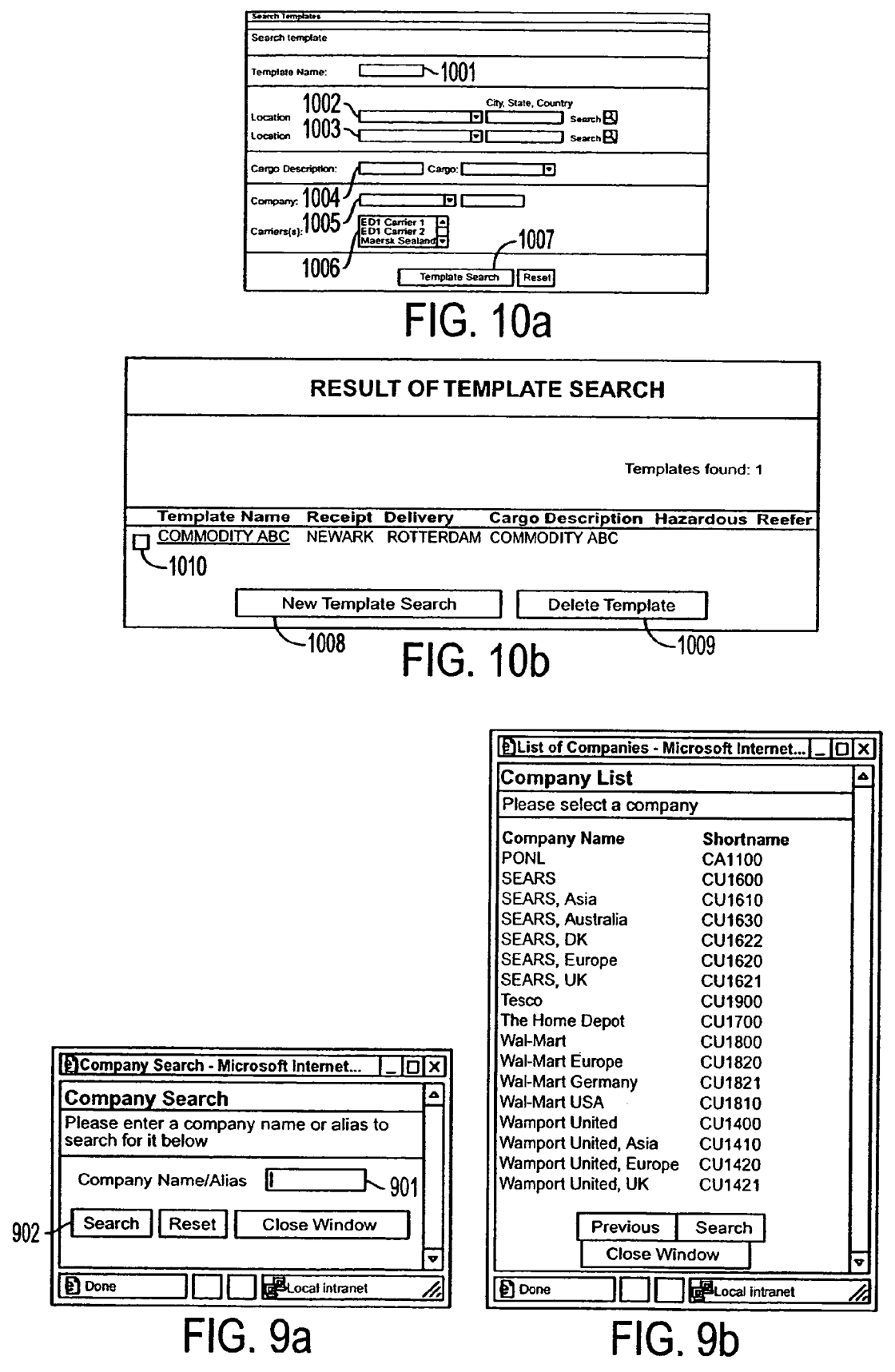

RESULT OF TEMPLATE SEARCH

Templates found: 1

| Template Name | Receipt | Delivery | Cargo Description | Hazardous | Reefer |
|---|---|---|---|---|---|
| COMMODITY ABC | NEWARK | ROTTERDAM | COMMODITY ABC | | |

SEARCH BOOKING

References:

Booking Number: —1101
Ocean Carrier Booking Number: —1102
Bill of Lading Number: —1103
Container Number: —1104
Booked Vessel: —1105
Booked Voyage: —1106
Latest Vessel: —1107
Latest Voyage: —1108
Cargo Description: —1109
Booking Status: —1110 [ALL ▸]

Location:

Dates: [Booking Creation Date ▸]
  Day    Month       Year
From: [17▸] [January▸] [2001]
To:   [31▸] [January▸] [2001]

Company: [All ▸]

Carriers(s): [Alianca / CMA CGM / Columbus Line]

Cargo: ▸—1111
Event: ▸—1112

[Search] [Reset]

FIG. 11

COMMON CARRIER SYSTEM

RELATED APPLICATIONS

This application is a Divisional of U.S. application Ser. No. 09/973,082 filed on Oct. 10, 2001; which is a Provisional of U.S. Application No. 60/238, 454 filed on Oct. 10, 2000, hereby incorporated by reference as to its entirety.

BACKGROUND OF THE INVENTION

Today, shipping goods is a complicated business. Carriers have a finite amount of cargo space, and accordingly, shippers often negotiate with multiple carriers to coordinate the movement of just one container. Typically to limit the uncertainty and cost of moving goods, shippers contract with multiple carriers to provide a predetermined volume of business to each carrier at an agreed upon rate. This gives shippers the flexibility to choose from a number of different carriers to transport goods (for example, shipping directly from Stockholm to New York, rather than through an intermediate location) and increases the likelihood of moving a container when the shipper needs the container moved while guaranteeing individual carriers a volume of business. In practice, a shipper sequentially contacts carriers to check availability. If one carrier doesn't meet the shipper's desires, the shipper then contacts another contracted carrier. For example, refrigeration may be required and only certain carriers may handle refrigerated goods, the shipper may negotiate with only those contracted carriers that provide refrigeration. Even if the carrier may handle refrigerated cargo, they may not have the cargo space available to move the goods by a given day. Accordingly, even if the shipper and carriers have executed a contract prior to negotiations to move goods, shippers are still effectively required to negotiate with multiple carriers when securing the transport of cargo.

Since shippers typically contract with multiple carriers, the shipper is required to learn and understand a variety of different carrier idiosyncrasies. The differences between carriers is compounded as each carrier attempts automation and/or direct booking over the internet. Each carrier booking system (or platform) may be different in the look and feel as well as in the process that one requests the transport of goods. This forces each shipper to learn each carrier's platform to effectively and efficiently book a shipment of goods. The entire process is both confusing and time consuming for shippers. Carriers are then faced with incorrect or irreconcilable booking reports leading to more lost resources.

Freight forwarders add yet another level to this complicated business. Freight forwarders generally coordinate the transportation of goods on behalf of the shippers. For example, if the shipper desires goods be shipped from Chicago to Tokyo, the freight forwarder, on behalf of the shipper, negotiates and/or coordinates with the carriers to arrange for the goods to be moved. Essentially, the freight forwarders provide shippers with a service and generally do not move the goods themselves. Thus, freight forwarders provide shippers with an alternative to coordinating transportation of goods with the carriers. Although, freight forwarders provide shippers with a valuable service, they also create inefficiency and increase shipping costs for shippers as the cost for the service of the forwarders is billed to the shippers.

Biasing results in yet another inefficiency. Forwarders may receive incentives to direct business to certain carriers over others. Also, as the complexity of the shipping business creates a desire for both shippers and freight forwarders to contract with certain carriers, this desire naturally creates a bias towards the contracted carriers. For example, if a shipper wants to move goods from Detroit to Spokane, the shipper may negotiate with a contracted carrier which only moves goods directly to Seattle. A second carrier would be needed to complete the transport from Seattle to Spokane, thus, requiring an additional leg to move the goods to Spokane. However, if the shipper wasn't biased towards the contracted carriers, the goods may have been shipped directly to Spokane using a non-contracted carrier. Accordingly, shippers or freight forwarders may be creating inefficiencies by not using all available resources.

Since shippers or freight forwarders typically move goods using a variety of carriers, tracking and tracing goods across different carriers is also costly. Because shippers or freight forwarders often coordinate transportation of goods with multiple carriers, they are required to learn how to track and trace goods according the specific carrier's platform. Since shippers may have hundreds of containers being shipped by many different carriers at any given time and want to know the status and related info for their shipments, both shippers and carriers devote large amounts of resources to tracking and tracing containers. It is not uncommon for carriers to devote an entire workgroup to handling phone calls from shippers requiring information on the location of their goods. A consolidated system is needed that permits shippers to track shipments from a variety of carriers. Also, a system is needed that permits tracking of a shipment across multiple carriers.

In recent years developers have used the internet to create virtual marketplaces that bring together buyer and sellers, run negotiations and give companies and their suppliers the ability to readily share information. Some attempts have been made to reduce the cost to the shipper by using the internet. One attempt was to give carriers the ability to post published rates and discount information for land, sea and air bearing cargo vessels allowing customers to evaluate prices prior to booking. Another attempt to use the internet, give shippers the ability to receive a plurality of bids from a plurality of participating cargo transportation entities. These systems merely identify the cost of doing business with a select carrier and no more. This does not solve the problem of having to use multiple carrier platforms to submit the booking request to different carriers. This also does not permit easy exchange of goods between carriers where multiple carriers are used for a single shipment.

Finally, warehousing goods, transporting goods, customs brokerage and trade finance are complicated pieces of a very complicated business. Accordingly, a need exists for a more efficient system for handling logistics and transportation of goods.

SUMMARY OF THE INVENTION

The disclosure provides a method and system that enables domestic and international transportation users to handle shipping transactions through a single common system through a neutral transportation portal. The system provides, among other things, transportation users with single point of entry for tracking cargo movements with multiple carriers. In various embodiments, the system also gives users access to scheduling, booking requests for booking cargo across several carriers and, in some embodiments, proactive event notification.

These and other benefits will become apparent as described in the drawings and related description.

BRIEF DESCRIPTION OF DRAWINGS

FIGS. 4a-4c illustrate an example of a booking request screen according to embodiments of the present invention.

FIG. 6 illustrates an example of the HAZMAT screen according to embodiments of the present invention.

FIG. 7 illustrates an example of the temperature control screen according to embodiments of the present invention.

Figures 8A, 8B:
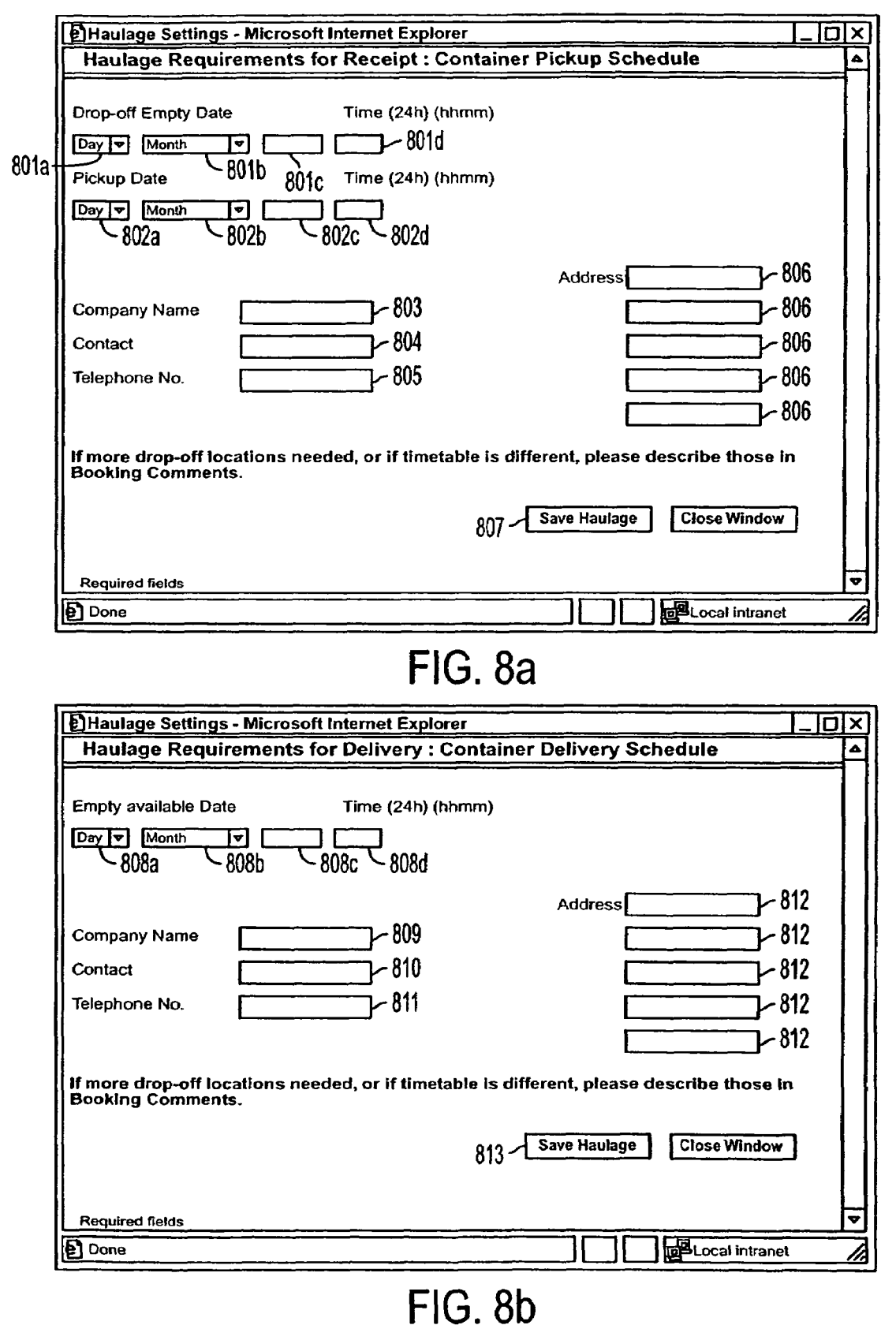

FIGS. 8a, 8b, 8c and 8d illustrate an example of haulage and search screens according to embodiments of the present invention.

FIGS. 9a and 9b illustrate an example of company search screens according to embodiments of the present invention.

FIGS. 10a and 10b illustrate an example of a search template screen according to embodiments of the present invention.

FIG. 11 illustrates an example of a search for a booking screen according to embodiments of the present invention.

DETAILED DESCRIPTION OF THE EMBODIMENTS

The following description is divided into sub-sections to assist the reader. The sub-sections include: terms; infrastructure; booking process and user interface; track and trace; and event notification.

Terms

The following terms are used in the description.

Shipper—Any entity with goods to be transported. The entity may desire the goods be transported or may be transporting the goods for a different entity.

Freight forwarder—An entity that coordinates the transportation of goods with a carrier or carriers for a shipper.

Carrier—Any entity that transports goods from an origin to a destination. The carrier may transport goods domestically and/or internationally. For example, a carrier may transport goods for a shipper from Chicago to Seattle or the same carrier may transport goods from Chicago to Paris. The carrier may transport goods using trucks, trains, planes, ships, and/or the like.

Carrier Platform—A carrier's computer system supporting an interface that enables exchange of information with the carrier.

Common Carrier System—Infrastructure that supports the common carrier interface including data storage.

Common Carrier Interface—An interface that enables multiple users and multiple carriers to communicate.

User—Any entity that uses the common carrier system. All users may have various levels of interest in using the common carrier system. The main users of the common carrier system may be shippers, third-party logistics providers, freight forwarders, consignees, brokers, trading portals, carriers and the like.

Booking—A reservation to transport a volume of goods from a single origin to a single destination. The goods may vary in product type, may be a mix of hazardous and non-hazardous, may require refrigeration and the like. The booking may be a single booking or may be repetitive.

Routing Request—A query to the carrier to determine if the carrier supports the basic transpirations of the cargo as part of the carrier product catalog.

Booking Activity Plan—A carrier plan that encompasses the major, or milestone, activities of a shipment.

Infrastructure

Figure 1A:
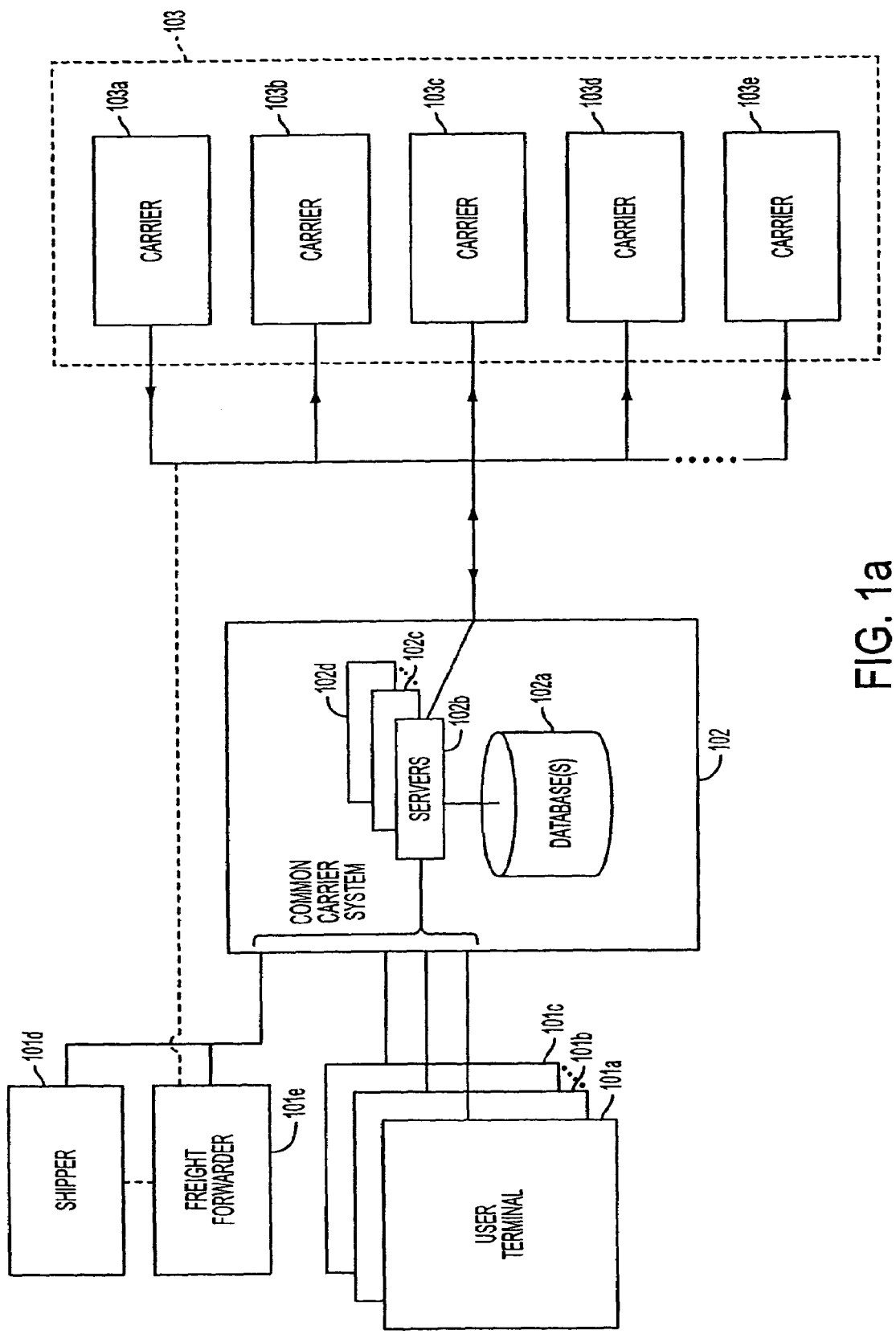
FIGS. 1a and 1b illustrate the system infrastructure according to embodiments of the present invention.

FIG. 1a illustrates an example of representative infrastructure according to embodiments of the present invention. The user 101a-101e, via terminals, communicates with a plurality of different carriers 103 through the common carrier system 102 including server(s) 102b-102c and database(s) 102a. In one embodiment, users use terminals to exchange information with the common carrier system 102. These terminals may be standard personal computers as are known in the art (for instance, a computer system using a PENTIUM III processor). In alternative embodiments, the users may use handheld or other portable devices as known in the art to communicate with the common carrier system 102. Further, the communications from multiple users may be batched together at a user's location prior to transmission to the common carrier system 102. Although FIG. 1a shows five users, five carrier terminals, one database and three servers, FIG. 1a is merely illustrative and the number of, users and/or user terminals, carriers and/or carrier terminal, servers and databases is not in anyway limited. Furthermore, although the embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system includes appropriate screen routines for generating a set of screens that together comprise a user interface for the site.

Figure 1B:
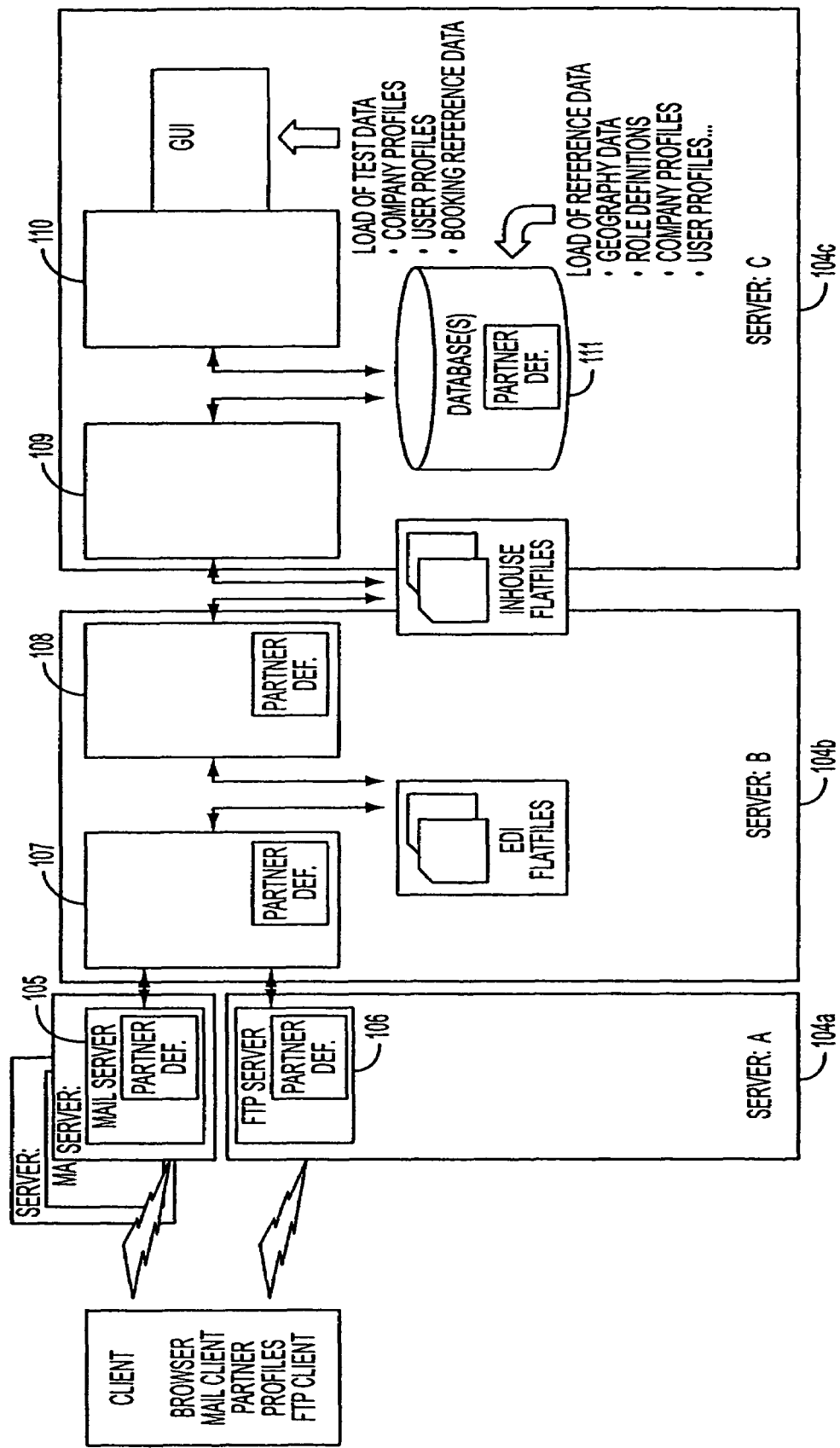

Referring to FIG. 1b, illustrates, in more detail, the common carrier system 102. The common carrier system includes, for example and without limitation, servers 104a-104c. Server 104a includes mail server 105 which may be used to receive and send data via email. Server 104a also includes server 106 for receiving and sending data over the internet. Server 104b includes server 107 as a communication bridge between server 108 and servers 105 and 106. Server 107 polls servers 105 and 106 for new messages, unpacks and sends the messages to server 108. For outbound polls from server 107, server 108 adds the receiver's address and triggers the transfer of the message. When server 107 fails to process an EDI message, an email will be sent to a predefined email address. Server 108 processes EDI messages by validating the data when called by server 107 and translating the data into the common carrier system layout format. For outbound EDI messages, server 108 is called by server 109 and server 109 feeds server 108 with the outbound EDI message in the common carrier system layout format. Server 104b includes servers 109 and 110. Server 109 converts and loads common carrier system layout to a set of database tables, or vice versa Server 109 also polls server 108 for any new messages, opens a connection to the database and populates the database tables corresponding to the EDI message type (300, 301, 315 and the like, show in FIG. 13). For outbound EDI messages, server 109 scans the database tables populated by an EDI processor and converts the message and then triggers server 108 to process the common carrier layout format. Referring to Server 110, the EDI processor is part of the server 110 that processes the EDI messages deposited into the database tables by 109. Server 110 scans the header of the database table for the first unprocessed message being marked for example as submitted. The status is then change from submitted to processing in the database 111 and if successful the status is then change to complete.

The present disclosure relates to a system and method for buyers and sellers of domestic and/or international transportation services related to the shipment of goods. The users and carriers may be linked to the system by dial-up modem to communicate to the internet, and accordingly, be disconnected from the system or off-line. For example, the user may use a dial-up modem and submit a booking request to a carrier through the internet and afterwards disconnect from the internet. After the user disconnects and is currently off-line, the common carrier system may submit the booking request to the carrier and receive confirmation of the booking request from carriers while the user is off-line. In another embodiment, the common carrier system 102 may process the information while the user is still connected with the internet. This permits the user to be notified as soon as availability is determined for various carriers or after a reservation has been made with the carriers by the common carrier system 102. The system and method offers shippers the opportunity to request and select specific service patterns offered by participating carriers in the booking of full container shipments. The system and method includes user interfaces, processes, computer systems, and computer-readable mediums having programs stored thereon. The system and method enable a user to submit booking requests to multiple carriers and/or track and trace the goods using a single common carrier system and interface. The system and method also may be used to provide event notification.

In general, when a shipper wants to move goods, the shipper submits a booking request to one or more carriers to which the carrier(s) responds by accepting, rejecting, or changing the booking request. A booking represents a shipper's intention to transport a volume of goods from a single origin to a single destination. The goods may vary in product type, may be a mix of hazardous and non-hazardous, may require refrigeration and the like. As a result, differing container types may be required. To accommodate differing cargo characteristics, a booking may contain one or more booking lines. The request may be made using a variety of different processes. The user 101 may send an email message to the common carrier system 102, who processes the email and acts in response. Alternatively, the user 101 may post information to a web site of the common carrier 102. Further, the user 101 may transmit information in the form of XML or EDI data sets for processing by the common carrier system 102. It is appreciated that a number of different transmission schemes may be used to forward requests to the common carrier system 102. The information received by the common carrier system 102 may then forward the requests to a variety of carriers 103. The common carrier system 102 may blindly forward the request to all carriers 103 to see who responds. Otherwise, the common carrier system may filter the booking request from user 101 to minimize the number of carriers 103 who receive the request. In addition, the common carrier system 103 may have a routing list as specified by the user for permitting the ordering of the hierarchy in which carriers are polled for booking availability.

The transmissions between the common carrier system 102 and the carriers 103 may also be in the form used by the user. Alternatively, the common carrier system 103 may translate the user's request from one form or format into one understood by the carrier or carriers 103. If needed, common carrier system 103 may add information or subtract information as needed for each carrier 103. For example, some carriers may use one type of units while others use another type of units. The common carrier system 103 then translates the units provided by the user for submission to the carrier. Also, the user may have certain needs if goods are transported one way as opposed to another (refrigeration needed if shipped in a container ship while no refrigeration needed if shipped by truck or train). If so, the common carrier system 103 may eliminate or modify the information transmitted to each carrier 103 so as to meet the needs of each carrier's platform and/or booking system. A booking line may include a single container type, single hazardous goods indicator, single refrigeration and a single commodity description. When the common carrier system receives the first carrier booking confirmation massage, for example the confirmation from carrier 103*a*, the system 102 may, upon the shippers request (any user using one of terminals 101*a*-101*e* or other known devices like, for example, a mobile PDA), automatically generate and submit booking cancellation to other carriers 103*b*-103*e*.

Alternatively, the booking request from the common carrier system 102 may request information from the carriers 103 of who has availability for handling the proposed booking. The response from the carriers 103 provides the common carrier system 102 with information of availability, shipping time frame, and other information.

In one example, an interested party, typically the shipper or freight forwarder, enters a booking draft with high-level details about the freight it desires to be shipped. Using the information entered on the booking, the user of the system may also, via terminals 101*a*-101*e*, issue a routing request through the common carrier system 102 to one or more carriers 103*a*-103*e*. One or more of carriers 103*a*-103*e* responds with detailed routing information. The shipper may request the carrier 103*a*-103*e* submit routing information based upon the data contained within the booking (place or receipt, place of delivery, etc.) The common carrier system 102 enable users (via terminals 101*a*-101*e* or by other known devices like, for example, a mobile PDA) to submit a booking, with or without a routing request, and it may be submitted to one or more carriers 103*a*-103*e*.

The actual interfaces between the user 101 and the plurality carriers 103 handling the routing request may be determined by the technical capabilities of the carriers 103. Sophisticated carriers 103 may provide direct online response through their internal systems. Other carriers 103 may use the service patterns interface to store available routings. At a minimum, all carriers may respond to routing request via using the common carrier system 102. Separate confirmation directed to each user may also be made (via email, instant messaging and the like).

If the booking party 101 chooses to so specify (for example, by checking a checkbox or similar object on the booking screen), the first carrier to respond with a valid response to the routing request may automatically be selected and the booking may be submitted to the carrier. Otherwise, the booking party may manually select the carrier and submit the booking. It is now up the carrier to determine if the actual transport of cargo may take place (based on vessel capacity, equipment availability, etc.) and either confirm the booking, decline the booking or make a counter proposal.

Referring to FIG. 1, after carrier 103a confirms the booking, the user sends shipping instructions using the common carrier system 102 by interacting with the common carrier interface. The information sent contains more details about the freight, such as hazardous/refrigeration characteristics. Since the booking already contains the rudimentary information about the care, the shipping instruction don't need to happen at any a particular time. The carrier then sends the bill of lading based on the shipping instructions.

Finally, when a carrier confirms the booking, the carrier may return a booking activity plan as part of the booking confirmation. The plan may be stored in the common carrier system database(s) 102a of the common carrier system 102 and subsequent track and trace messages may be used to measure performance (time to process bookings, percent on time delivery, claims, misdeliveries, etc.) against the booking activity plan.

The common carrier system enables the common carrier interface provides the users with a unified booking interface and procedure while also providing an additional source of bookings for the carriers.

Furthermore, the common carrier system and interface enables the user to create templates tailored for their specific needs. Accordingly, the user may quickly create template-driven booking requests without having to step through the entire booking process. Also, Identifying and registering a user's consignees, forwarders, shippers, et al., may facilitate the template building process and provide shipment visibility to user's partners as quickly as possible.

Booking Process and User Interface

The description of the first embodiment is organized to show process flows as taken by the user. Various user interface screens embody the process flows. FIGS. 2a-2g illustrate the booking process from creating a booking request, using any one of the three booking methods, through receipt of booking confirmation. FIGS. 3-12 illustrate the various screens the user may encounter throughout the booking process described by FIGS. 2a-2g. Although, FIGS. 3-12 illustrate display screens, the particular screen layouts are used for exemplar purposes only and should not be taken to limit the scope of the embodiments in any way.

Figure 2A:
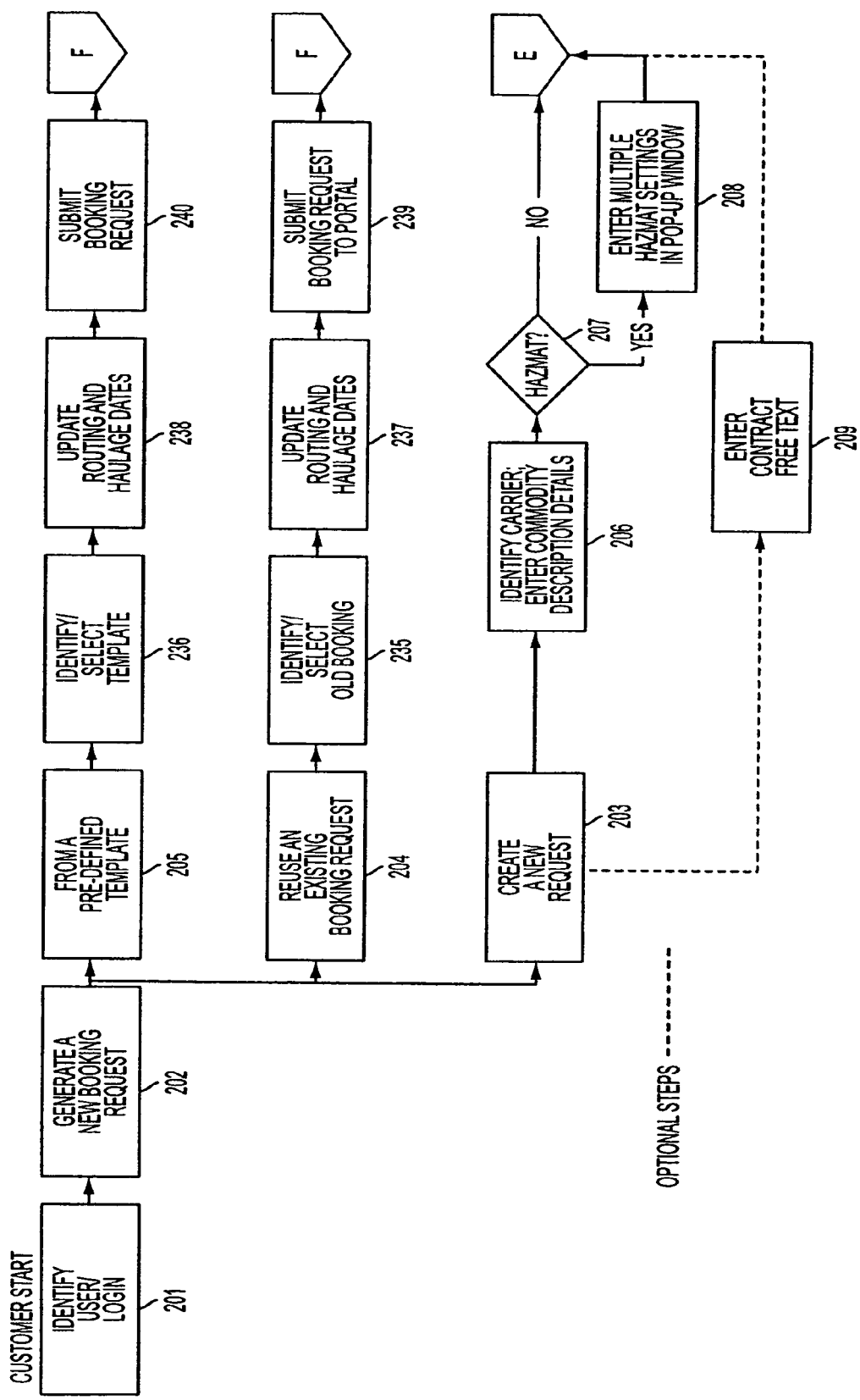
FIGS. 2a, 2b, 2c, 2d, 2e, 2f and 2g illustrate a flowchart depicting a booking process according to embodiments of the present invention.

The process of creating a booking request through confirmation will now be described, with reference to FIGS. 2a-2g. The process may be rearranged as needed or to accommodate faster information processing. Referring to FIG. 2a, first the user logs into the common carrier system as shown in step 201. At step 202, the user selects a new booking request. At steps 203-205, the user chooses from creating a new booking request, reusing an existing booking request and creating a booking request from a predefined template.

Creating a new booking request will now be described. If the user chooses to create a new booking request in step 203, then the user continues to step 206 and identifies the carrier and the commodity description details. If HAZMAT data is not desired, the user advances to step 210 of FIG. 2b. If HAZMAT data is desired, the user enters the data at step 208 via a pop-up window and then advances to step 210. Optionally, the user may enter contract information at step 209 in a free text field.

Figure 2B:
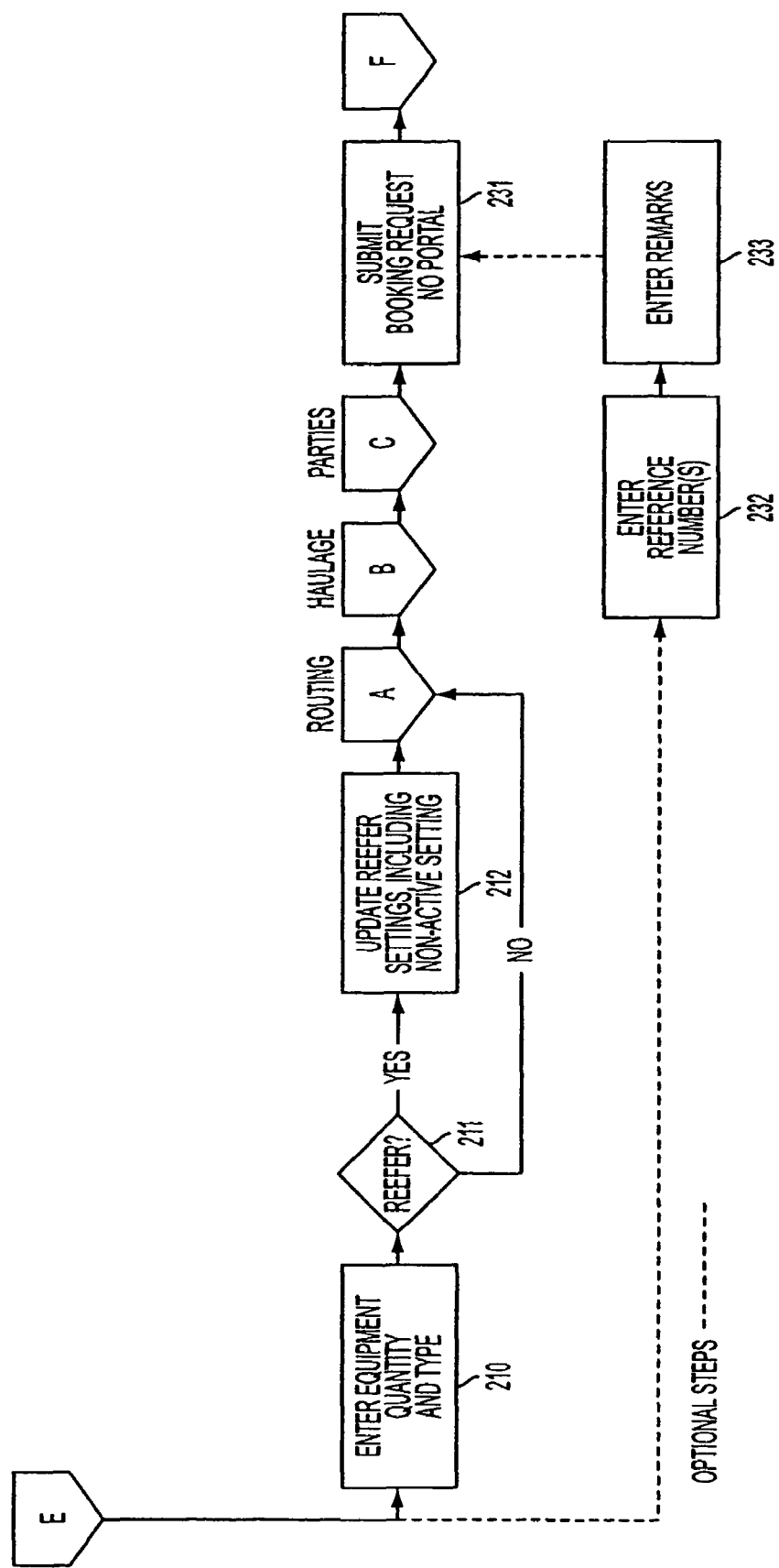
Figure 2C:
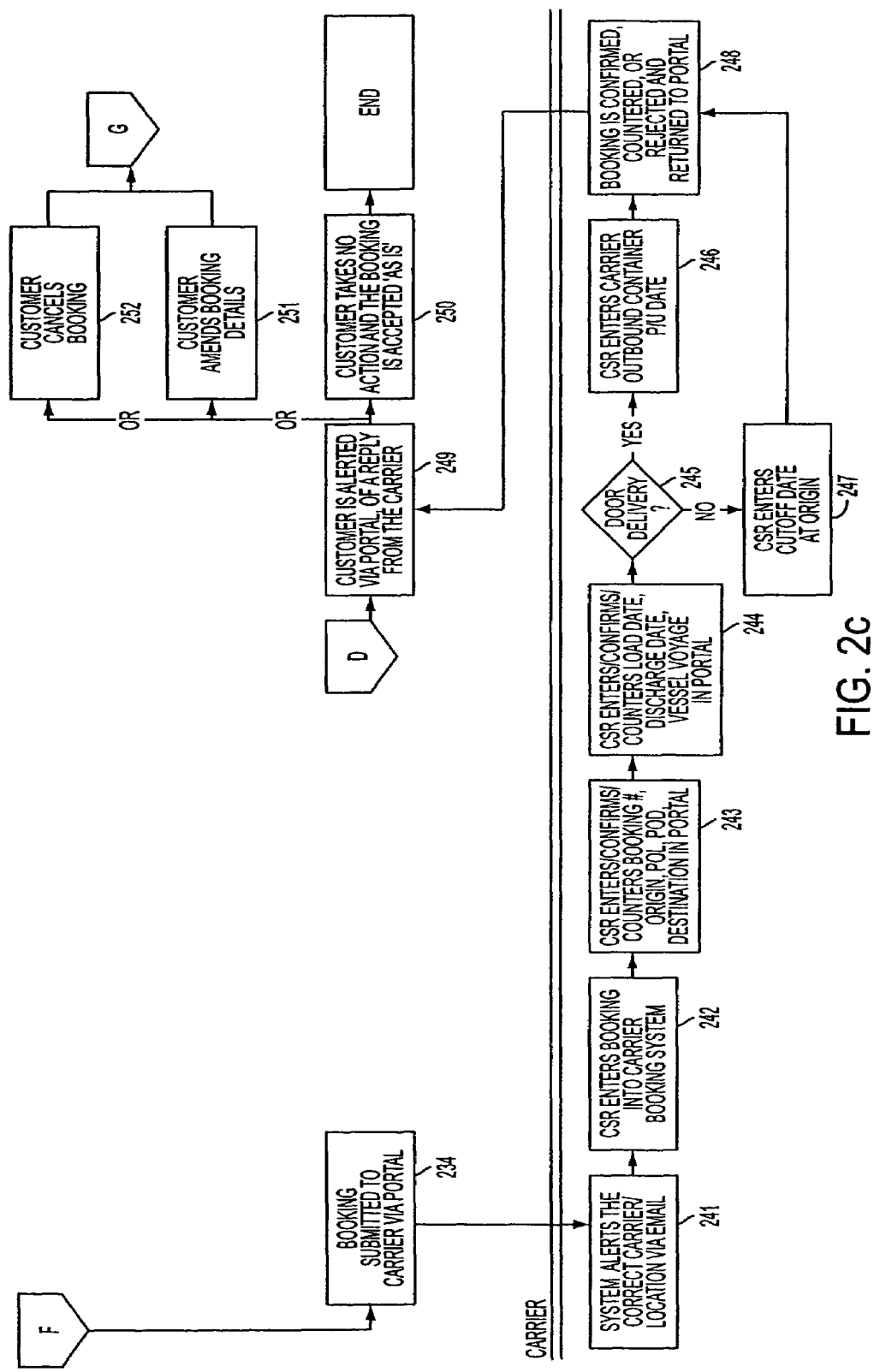
Figure 2D:
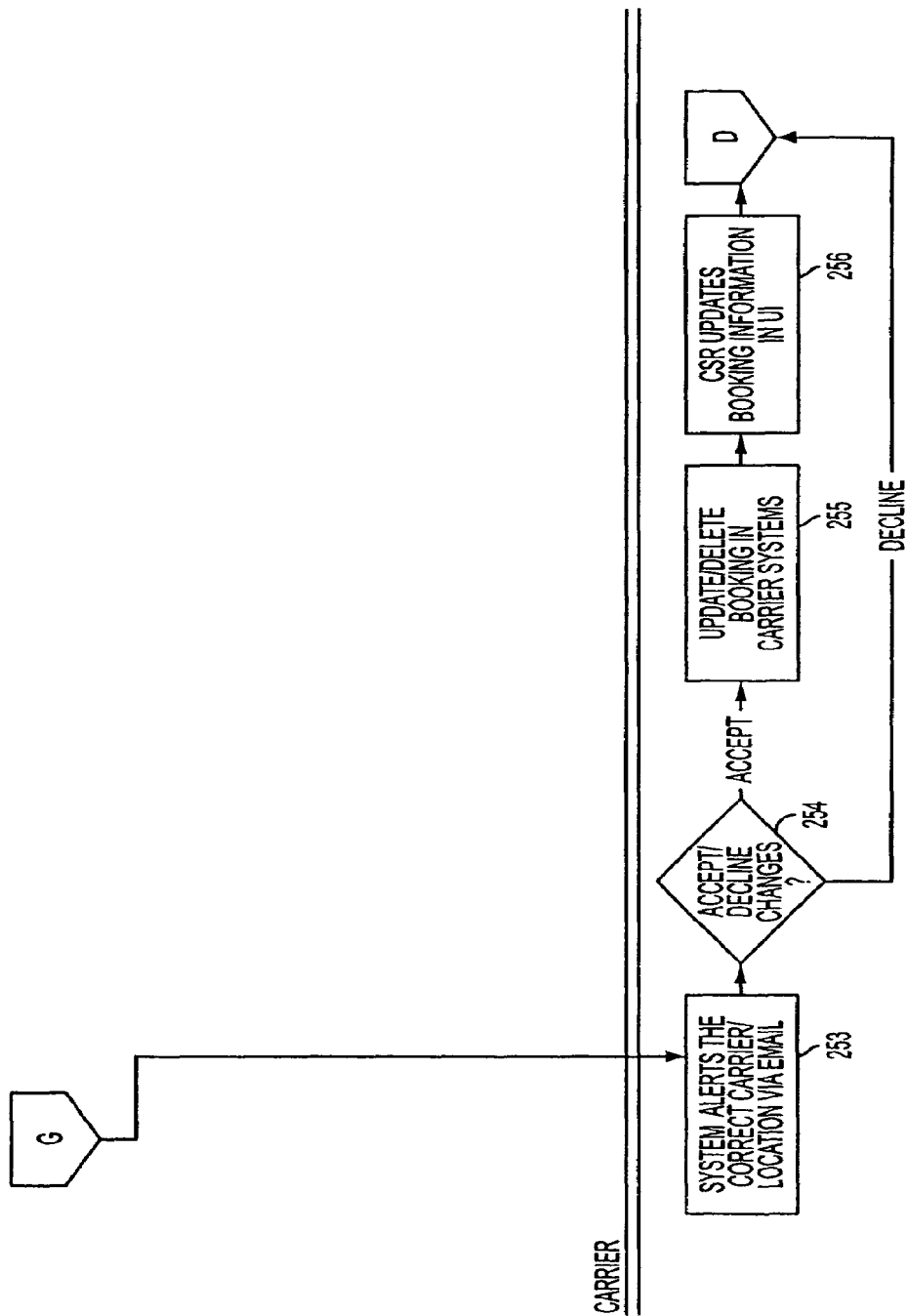
Figure 2E:
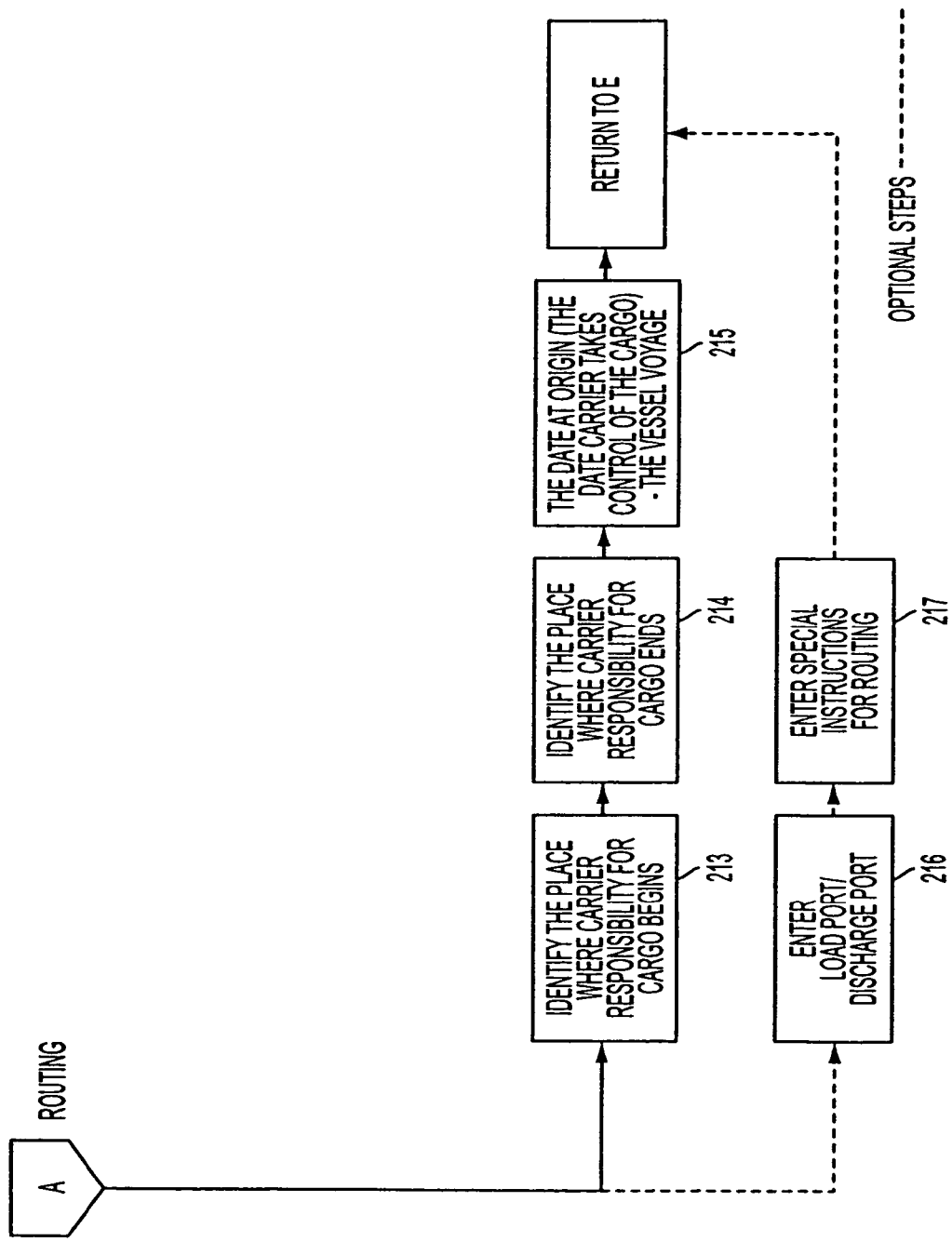

Referring to FIGS. 2b and 2e, at step 210, the user identifies equipment quantity and type. If specific environmental conditions are not desired, the user continues to step 213. If certain environmental conditions are desired, at step 212, the user enters the appropriate data and then advances to step 213. At steps 213-215, the user identifies the place where the carrier responsibility for cargo begins including the pick-up date and the place where carrier responsibility for cargo ends including the delivery date. Optionally, the user may enter the load location and discharge location and/or special instructions in steps 216 and 217.

Figure 2F:
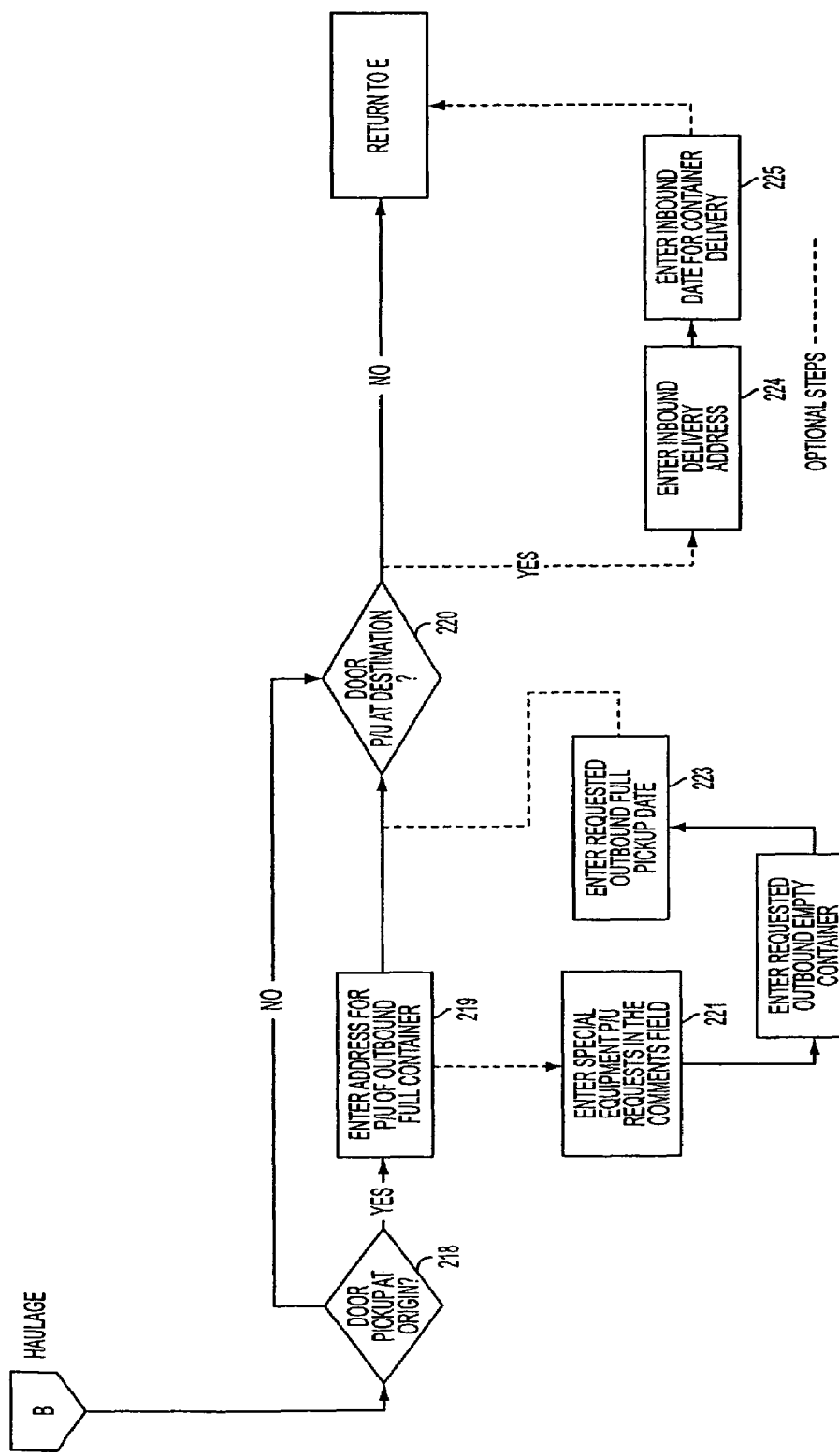

Referring to FIG. 2f, from steps 215 or 217 and if door pick-up is desired, the user advances to step 218. If not, the user advances to step 220, door drop-off. From step 220, if door drop-off is not desired, the user advances to step 226. If door pick-up is desired, the user identifies the address, any necessary comments, and dates at steps 221-223. The user then continues to step 220. If door delivery is desired, the user identifies the delivery address and the date for container delivery during steps 224 and 225, respectively.

Figure 2G:
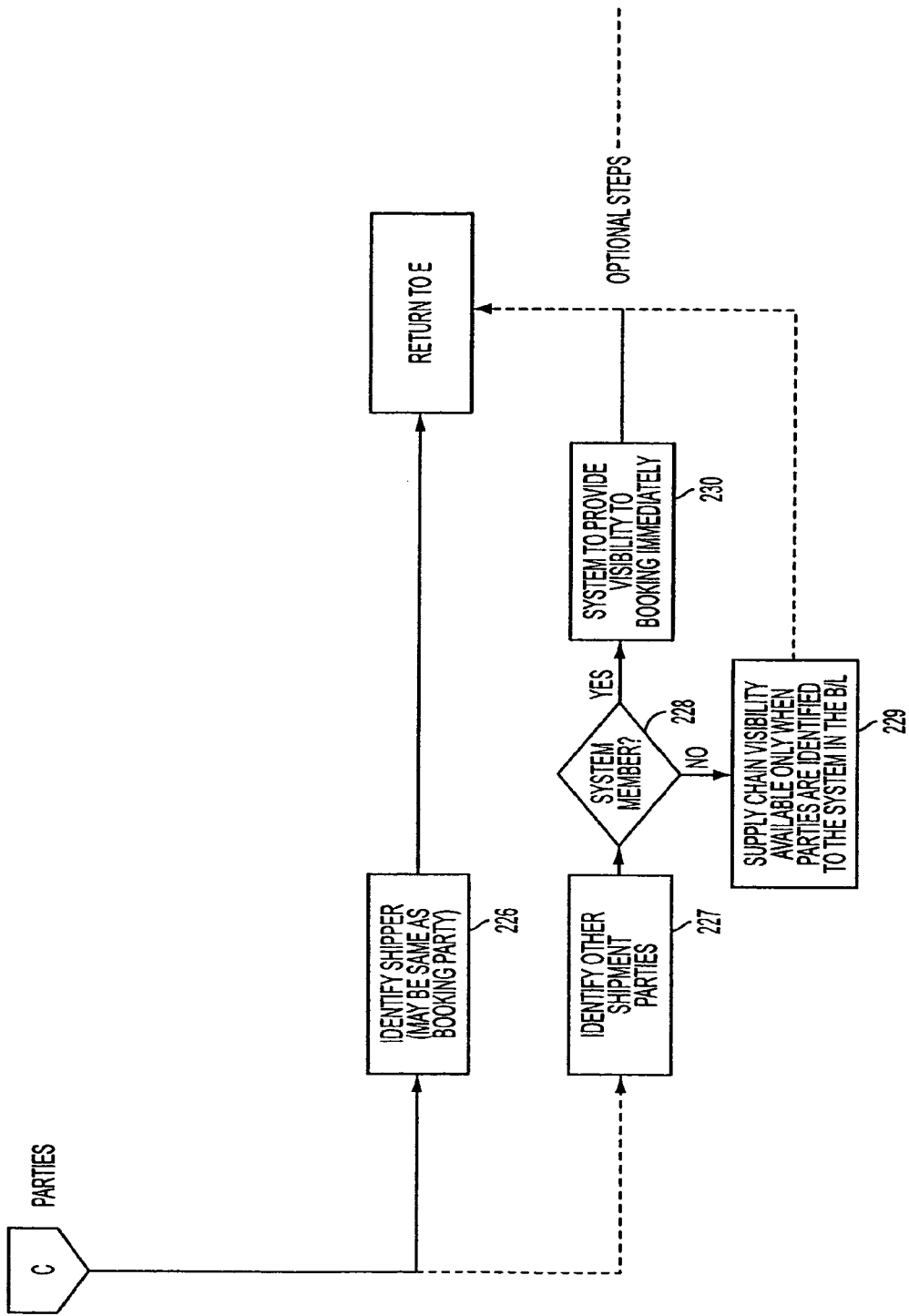

Referring to FIG. 2g, from steps 220 or 225, the user advance to steps 226, and if desired, step 227. The user identifies the shipper and other shipment parties, step 226. The shipper may be the booking party. If the other shipment parties are not registered, the system may not provide visibility. However, the system may provide booking visibility immediately to registered parties, steps 227-230.

After identifying the shipping party at step 236 and steps 227-230, the user advances to step 231 and submits the booking request to the system, wherein the system submits the booking request to the carrier at step 234. The user may also reach step 234 by entering a reference number and remarks during steps 232 and 233, respectively. Additionally, the user may reach step 234 by reusing an existing booking request or from a predetermined template as shown in FIG. 2a, steps 204 and 205. The user identifies the old booking or the template and then updates the routing, haulage, dates and submits the updated booking request, steps 235-240. Furthermore, the common carrier system enables entities to register via the common carrier interface.

Referring to FIG. 2c, the carrier may be alerted by the common carrier system, via Electronic Data Interchange ("EDI"), email, common carrier interface pop-up dialogue box and the like, step 241. CSR enters the booking into the carrier's booking system and confirms or counters the booking origin, POL, POD, destination, load date, discharge date, vessel voyage and the like in the common carrier system, steps 242-244. If door delivery was requested, the CSR enters carrier outbound container P/U, if not, the CSR enters cutoff date at origin in the common carrier system, steps 245-247. The booking is confirmed, countered or rejected and returned to the common carrier system. The common carrier system alerts the user of the reply from the carrier, steps 248-249. The user takes no action, and thus, accepts the booking as is, cancels the booking request or amends the booking request, steps 250-252. If the user cancels or amends the booking, the carrier is alerted and accepts, declines or changes the booking in the carrier system and updates changes in the common carrier system. The common carrier system submits the response to the user via EDI, email, common carrier interface pop-up dialogue box and the like, steps 253-256.

Figure 3:
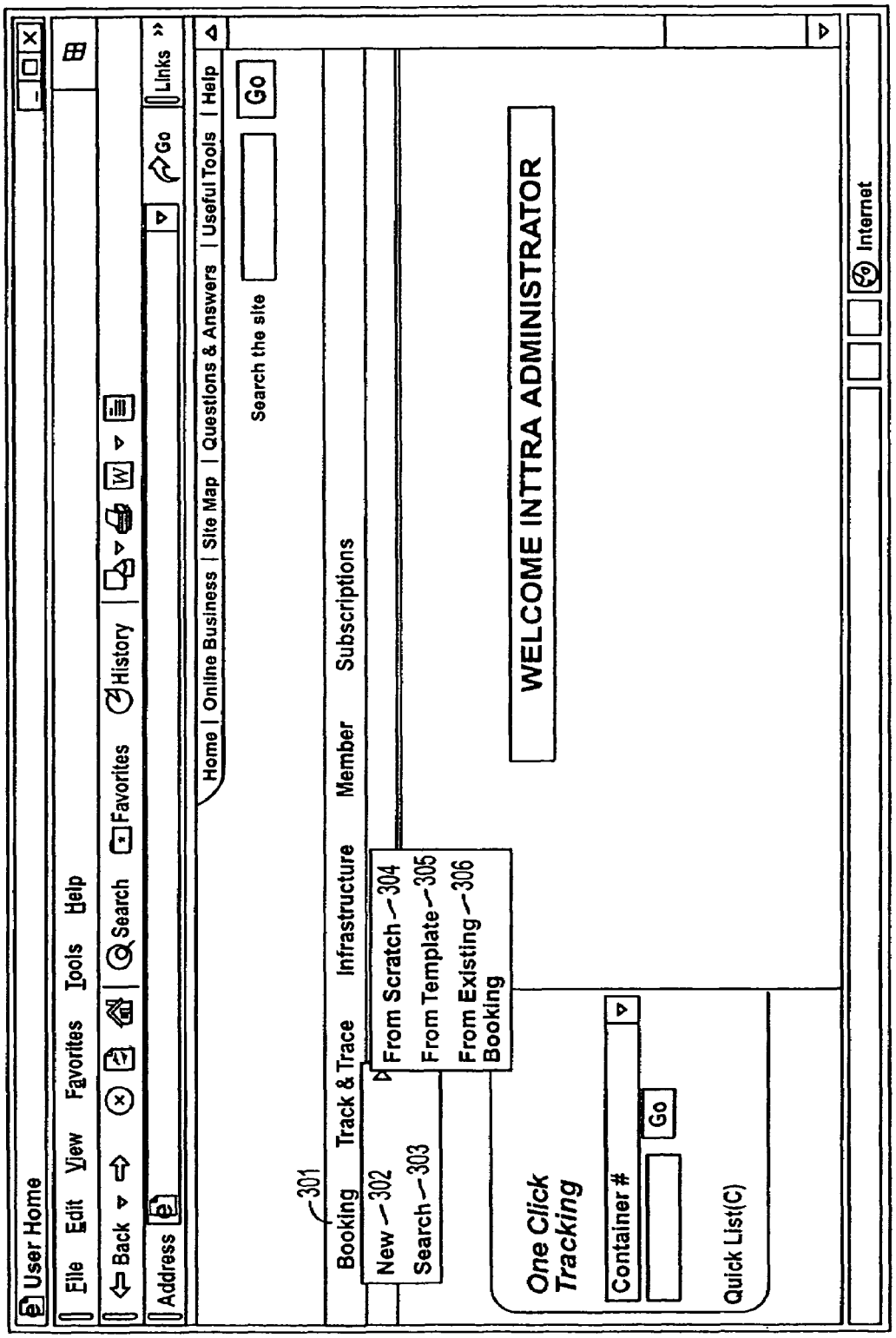
FIG. 3 illustrates an example of a selection screen according to embodiments of the present invention.

As illustrated in FIGS. 2 and 3, the user, after login, has a number of options to navigate through the common carrier system. To create a new booking request, the user selects the "Booking" menu option 301. This menu option enables the user to create a new booking request 302 or search for an existing booking request 303. If the user needs to create a new booking request, then the user has three options: (1) create a new booking request from scratch 304, (2) reuse an existing booking request 306 and (3) create a booking from a predefined template 305 as shown in FIG. 3.

Creating new booking request will now be described with reference to FIGS. 3-10. Upon selecting the "from scratch" menu option 304, shown in FIG. 3, the user is linked to the new booking request screen, shown in FIG. 4a-4c. The new booking request screen is divided into several sections: (1) carrier selection 401, cargo information 402, container information 403, routing information 404, booking parties 405a-405d, and additional information 406. Each enables the user enter information. Although all sections are shown on a single screen, this is merely an example and should not be taken to be limiting in any way. For example, each section maybe shown using a separate screen. Each of these sections will now be described with reference to FIGS. 4-9

Figure 5:
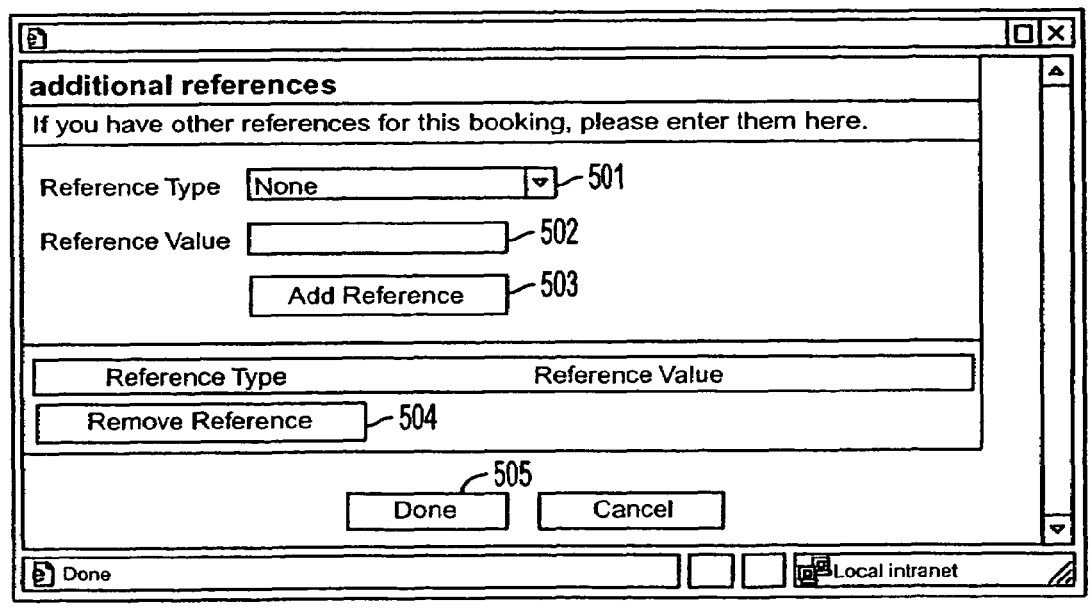
FIG. 5 illustrates an example of a contact section of the booking request screen according to embodiments of the present invention.
Figure 8C:
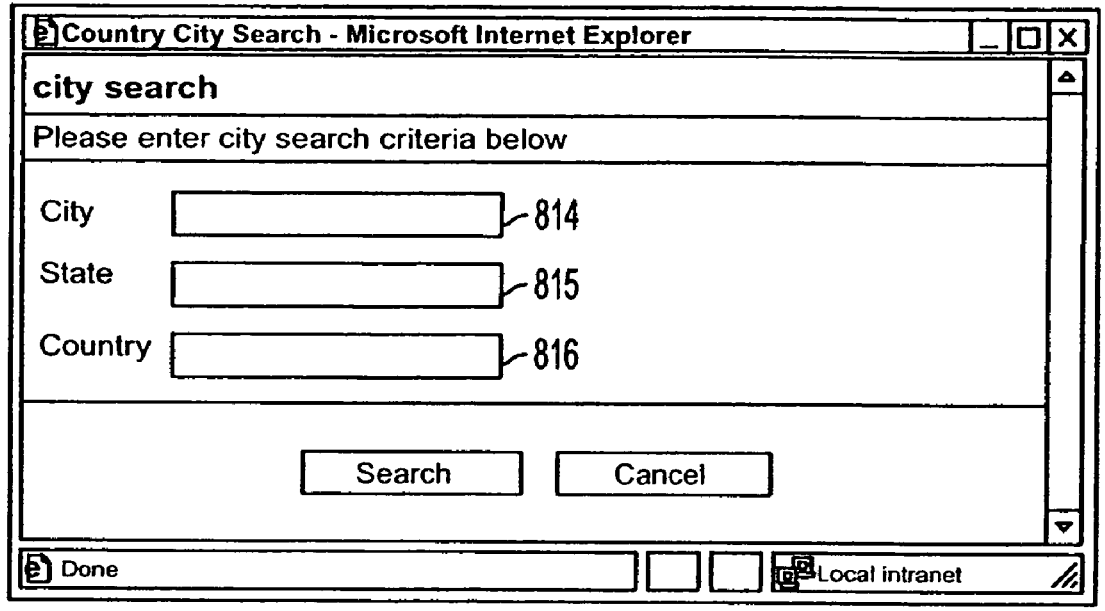
Figure 8D:
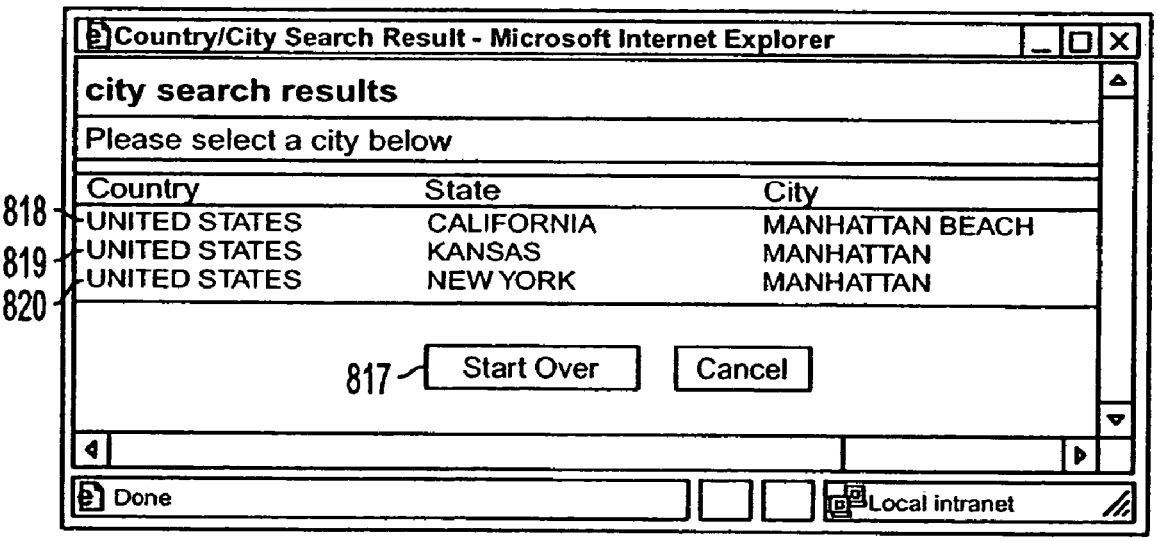

FIG. 4a shows the carrier selection section 401 of the booking request screen. To enter information in this section, the user clicks the "Select Carrier" drop-down menu 407 and identifies which registered carrier may be sent in the booking request. If desired, the user may enter a contract reference, the quote number or TLI in the contract reference field 408. Optionally, the user may enter a PO number into the PO number field 409. If desired, the user may attach additional reference numbers by clicking the "Additional Reference Numbers" button 410 which would link the user to the additional reference screen as shown in FIG. 5. The user may enter a reference type by using a drop-down menu 501. Also, the user may enter a reference value in the reference value field 502, add a reference by clicking the "Add reference" button 503, and/or may remove reference(s) by clicking the "Remove Reference" button 504. After the user has entered the appropriate data for each object, the user clicks the "Done" button 505.

Figures 6, 7:
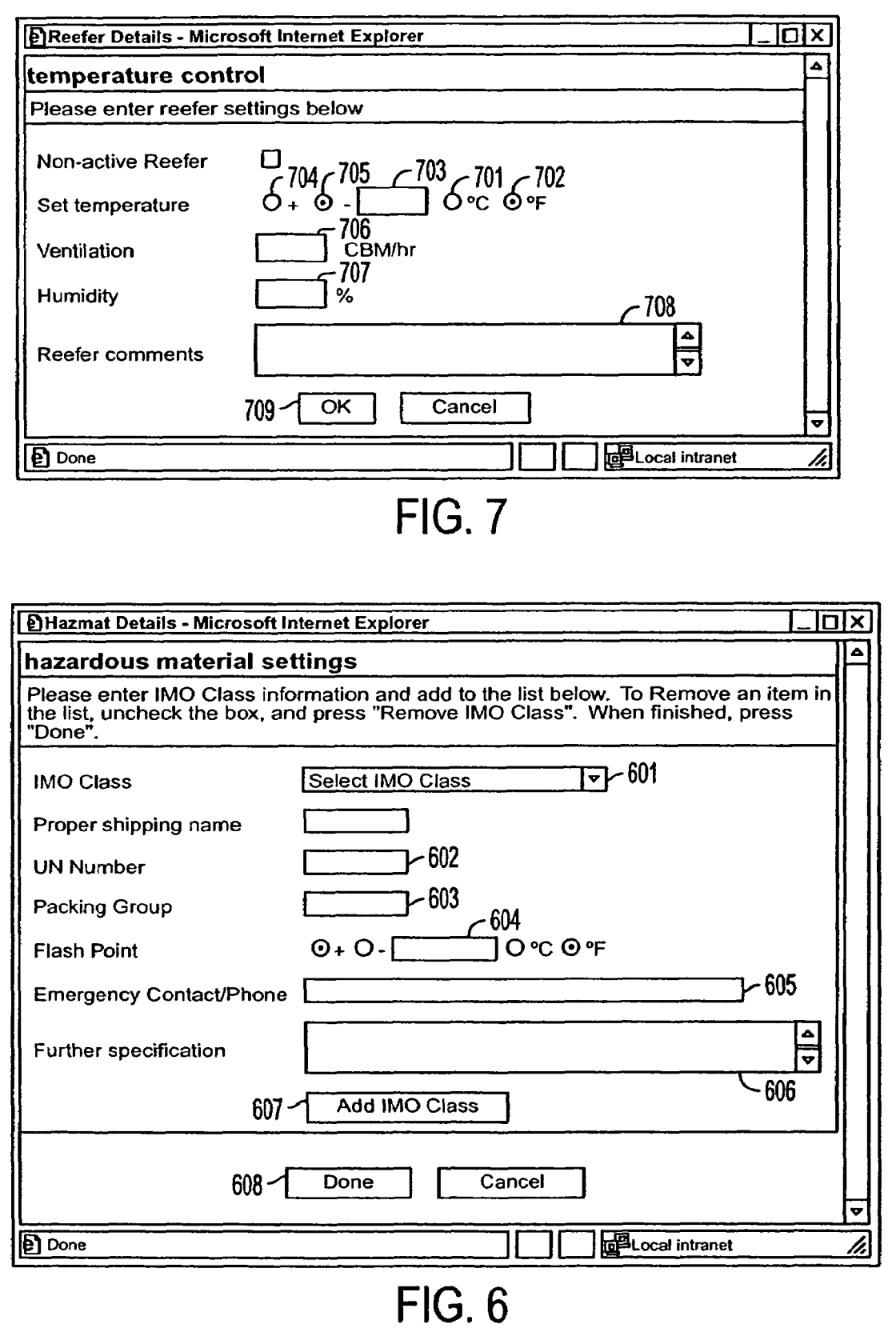

Referring to cargo section 402 of FIG. 4a and FIG. 6, the user may enter the commodity description in the description field 411, along with the total cargo weight in the total cargo weight field 412. The user defines the total cargo weight as being either metric or imperial using drop-down menu 413. If the commodity is hazardous, the user may click the "Hazmat" button 414. This button links the user to the hazardous material settings window shown in FIG. 6. The common carrier system supports multiple hazardous IMO classes per commodity. For example, a commodity "Car Parts" may hold two hazardous line items, one for seat belt tensionless, and another for air bags. The user selects the appropriate hazardous class from the "IMO Class" drop-down menu 601 and then user enters the proper shipping name and the four digit UN number in the un number field 602. Additionally, the user may enter the packing group, flash point, emergency contact details and further specification for each IMO line item in fields 603-606, respectively. Once all the details for one IMO class have been entered, the user clicks "Add IMO Class" button 607 to associate the hazmat details with the commodity. After the user is finished inputting of the hazmat details for all the commodities the user clicks the "Done" button 608.

Referring to the container information section 403 of FIG. 4a and FIG. 7, the user enters the number of containers they wish to request in the quantity free text field 414. With the "Type/Size" drop down menu 415, the user identifies the kind of equipment they wish to request. Some carriers do not support some types of equipment. To help the user, carrier-specific equipment may be identified in the drop down free text literals. The user identifies at least one container for each booking request. In the container information section, the user has the option of selecting the "Temperature Control" button 416 to bring up the refrigeration details pop-up window as shown in FIG. 7. The user may set the booking temperature as Fahrenheit or Centigrade by clicking the ° C. or ° F. buttons 701 and 702, respectively, set the temperature using field 403 and clicking either button 404 or button 405; set the ventilation in cubic meters per hour using field 706; set the humidity settings as a percentage using field 707; and provide additional comments using field 708. After enter the appropriate setting, the user clicks the OK button 709 to save the environmental settings.

Referring to the routing information section 404 of FIG. 4b and FIGS. 8a, 8b, 8c, and 8d, the user enters the routing details for the booking request. The user enters the place of origin in field 417 (place of origin is the location where the carrier's responsibility for the cargo begins); the requested date at origin in fields 418a-418c (the date when the carrier takes responsibility for the cargo); the requested vessel voyage in field 419; and the destination in field 420 (the location where the carrier's responsibility for the cargo ends). Optionally, the user may enter the load and discharge locations in fields 421 and 422. If the user desires to have the product picked-up, the user clicks the "Door Pickup" button 423 which links the user to the door pickup details screen shown in FIG. 8a. The user then enters the outbound empty equipment drop-off date and time in fields 801a-801d, the outbound stuffed equipment pick-up date and time in fields 802a-802d, and additional door pick-up details, including company name, contact details, telephone, and the pick-up address in fields 803-806, respectively. After entering the appropriate information, the user clicks the "Save Haulage" button 807 to update. Additional haulage details may include hot load, equipment drop-off schedules and the like. If the user desires to have the containers delivered, the user clicks the "Door Delivery" button 424 which links the use to the haulage requirements delivery screen shown in FIG. 8b. The user enters the inbound empty equipment availability date and time in fields 808a-808d and additional door pick-up details, including company name, contact details, telephone, and the pickup address in fields 809-812, respectively. Followed by the user clicking the "Save Haulage" button 813 to update. Additional haulage details may include hot load, equipment drop-off schedules, and the like.

Optionally, the user may search to find the common carrier system for the registered locations of the place of origin, load and discharge locations. Several locations in the booking screen may be registered (non-free text) locations. To assist the user with identify these locations, the user may link to the search screen for assistance by clicking any of the buttons 425-428. The user may enter any combination of city, state, and country in fields 814-816 and press the search button 817 of FIG. 8c. The common carrier system displays the results shown if FIG. 8d. The user clicks on the correct location to select it, for example click on line 818, 819 or 820, or clicks the "Start Over" button 817 to return to the search screen.

Referring to the booking parties section 405 of FIGS. 4b-4c and FIGS. 9a, and 9b, the user enters the booking parties, thus, identifying the parties associated with the booking request. The booking party may be identified as any one of shipper, export forwarder, consignee, contracted party and the like. Either the shipper or the export forwarder is identifiable on the system. To receive cargo visibility as soon as possible, the identified parties may be registered on the common carrier system. The parties may register with the common carrier system using the common carrier interface. If booking parties are not selected in this section, they may not be able to view the booking until their contact information is retrieved from the BL. That is, booking parties identified by the user may be capable of viewing the booking so long as they were a party selected by the user and they are registered with the common carrier system. Registration may be completed using the common carrier interface. Using fields 429a-429d, 430a-430d, 431a-431d, 432a-432d and 433a-433d as shown in FIGS. 4ba and 4c, the user may enter the name, address, reference, contact, and telephone number of the booking parties. So long as the party is registered, that party may view the booking.

FIGS. 9a and 9b show a company search window for the user's convenience. When the user clicks the "Search" buttons 434a-434d from any booking party section, the user is linked to the company search pop-up window. The user enters the company name in the window in field 901 and clicks the "Search" button 902. The user then clicks on the desired company. An example list is shown in FIG. 9b.

Referring to the additional information section 406 of FIG. 4c, if desired, the user may provide additional information by entering the additional comments in the additional information field 435. This area is free text and may hold, for example, details not be captured in the existing booking screens. Comments, for example, may include drop and pick; hot load, drop-off/pick-up schedules, HAZMAT details and the like should be entered here.

Once the user entered all initial data, the user may send the booking request, save the booking request as a draft or save the booking request as a template by clicking one of the appropriate buttons 436-438. If the user sends the booking request, the carrier selected by the user may then be alerted by the common carrier system and reply to the user's booking request. If the user saves the booking request as a draft, the user may at a later time complete the booking request and send it to the carrier and/or save the booking request as a template.

Creating a booking request from a template will now be described. Referring to FIGS. 10a and 10b, to create a booking request from an existing template, the user starts from any of the common carrier system screens after login and selects the "New" 302 menu and then the "From Template" menu 305 from the booking menu 301 as shown in FIG. 3. This action links the user to the template search screen. The user enters at least one of the template name, origin/destination, cargo description, company, and carriers in fields 1001-1006, respectively, to find the booking template. Once the user enters the data, the user clicks the "Template Search" button 1007. The common carrier system generates a list of any template that matches the search. The user selects the desired template. An example list is shown in FIG. 10b. If desired, by clicking the "New Template Search" button 1008, the user may add or remove criteria to limit or broaden the search. Once the user finds the appropriate template, the user may, for example update the dates associated with the booking along with additional booking request fields. The user may save the template and/or submit the booking request to the carrier. If desired, the user may delete the template, for example, by checking a box, like 1010, and clicking the "Delete Template" button 1009.

Reusing an existing booking request will now be described. Referring to FIG. 3 and FIG. 11, starting from any of the common carrier system screens after login, the user select the "New" menu 302 and then "From Existing Booking" menu 306 from the booking menu 301 of FIG. 3. This action links the user to the search booking screen shown in FIG. 11. The user inputs data in at least one of references, booking number, ocean carrier booking number, bill of lading number, container number, booked vessel, booked voyage, latest vessel, latest voyage, cargo description, location, dates, company, carriers, cargo and event fields 1101-1112, respectively. The user selects the desired template from the returned list of old bookings, or performs another search. Once the user finds the desired booking request, the user updates the booking and submits and/or saves the booking request.

The common carrier system is capable of developing forms for the common carrier interface which help users capture their tradelanes, commodity and equipment requirements, routing, and booking party details. These forms enable the common carrier system to create customer specific booking request templates. In most cases, a booking template capture the majority of fields described above, and worksheets group these fields into easily understood sections.

Bookings may be made, for example, through the common carrier system user interface, Electronic Data Interchange and the like. EDI transmission pass through the common carrier system to allow common carrier system functionality to be used. For example, track and trace functionality require the booking EDI transmission pass through the common carrier system. Booking made via the common carrier system user interface may be made from scratch of facilitated by means of previously saved data in the form of templates or previous booking as described above.

Track and Trace

This embodiment enables the user to track and trace only by identifying container as opposed to tracking and tracing by identifying both carrier and container. That is, the user does not need identify which carrier is transporting their container. Accordingly, the common carrier system enables the user to track and trace containers across multiple carrier platforms from a single system, the common carrier system.

The common carrier system facilitates track and trace information within the confines of a carrier's responsibilities. The boundaries for tracking a shipment directly reflect the associated route and service patterns supporting that container's movement. Applicable common carrier system users, via terminal 101a-101e of FIG. 1, have the ability to view the execution status of the shipment(s) on an as-needed basis. The booking activity plan defines the carrier's intended method and times for transporting a container from its origin to its final destination. This provides the benchmark for determining whether events that should have occurred have not. The common carrier system 102 alerts the parties of non-confirmation. The carriers offer event reporting against the milestones contained in the booking activity plan. The system operates using standard event codes and standard event messages. In other words, carriers 103 may update the common carrier system 102 using common reporting information. Alternatively, the common carrier system 102 may receive tracking information from each carrier in each carrier's native reporting format. The common carrier system 102 then extracts desired information from the carrier's tracking information and formats it into a style that is extensible to the user 101. Also, an intermediate format may also be used to internally store the tracking information from each carrier in the common carrier system 102. The system may log when event messages are received (in local time) to enable carrier performance monitoring.

To use the track and trace function, the user request a booking with a common carrier registered carrier using the common carrier system as outlined above. The carrier confirms the booking request and submits a booking activity plan for the booking at the same time. A single booking supports a single booking activity plan. The booking may consist of multiple container movements. The booking activity plan may be used to support track and trace information at the container level. The booking activity plan may provide greater information than a service pattern, since each main leg may be broken down into actual transport modes, transshipment locations and interim arrival and departure date/times.

Once the carrier submits the booking activity plan the container may be tracked and traced. The carrier submits the track and trace events to the common carrier system either by EDI or via a common carrier system user interface. Carriers may continue to use their own coding convention when submitting events by using EDI translator. EDI translator translates carrier event codes and message formats into a common carrier system neutral format. The common carrier system may record when a shipment has departed and arrived at the various location and record when business processes or non-conformances occur. The common carrier system may also record the date and time when the common carrier system receives track and trace events. The date and time recorded by the system maintains consistency with the date and time associated with where that event occurred (e.g. from GMT to local time of the shipper, local time of the destination location, local time of the sending location, and the like). That is, the date and time may be adjusted to match the time zone of the user or other parties.

The user uses the track and trace function by using the common carrier system track and trace user interface. This enables the user to select criteria against which a search may be conducted. The user has the ability to customize how the search results are displayed. The user has the ability to customize display results on an individual container basis or on a "batched" container basis. The common carrier system may "batch" container records. When the common carrier system returns track and trace information on "batch" records, the user has the ability to drill-down to the container level detail and to drill back up. Furthermore, the user has the ability to ascertain, at glance, where the container is in relation to the activity plan and clear visibility as to what events have been successfully completed and which were not.

Figure 12A:
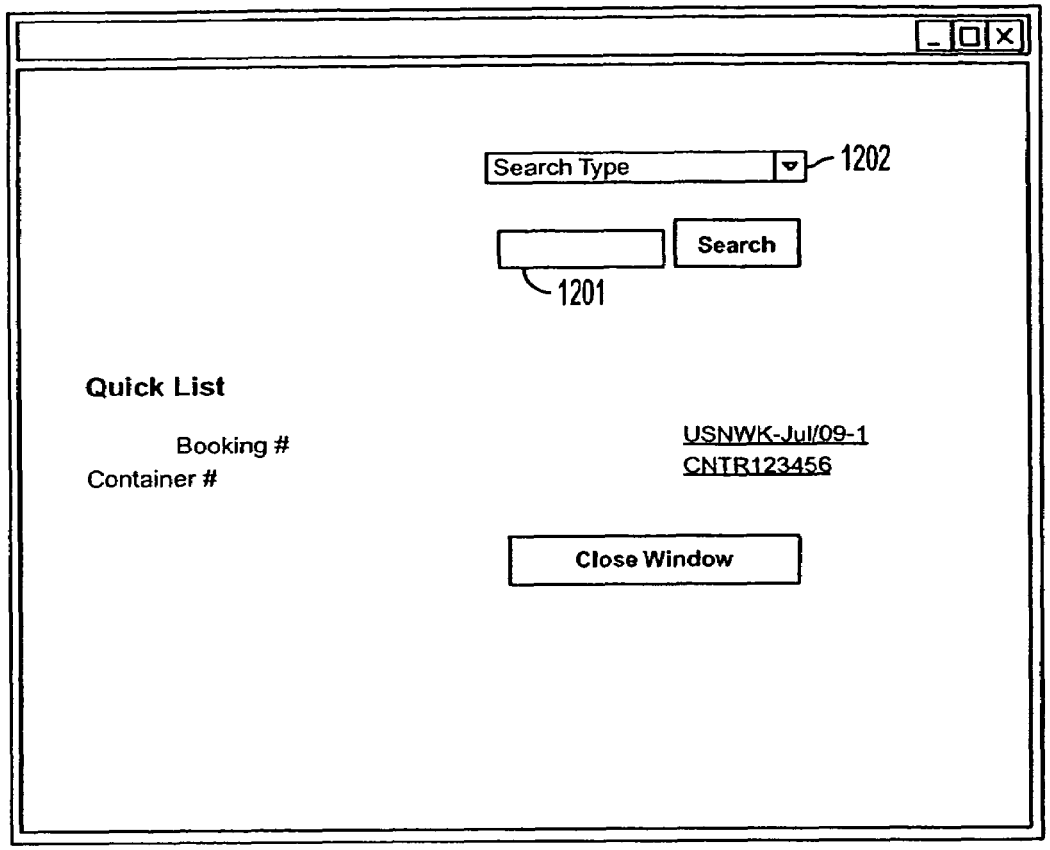
FIGS. 12a, 12b and 12c illustrate examples of track and trace screen and result screen according to embodiments of the present invention.
Figure 12B:
Figure 12C:
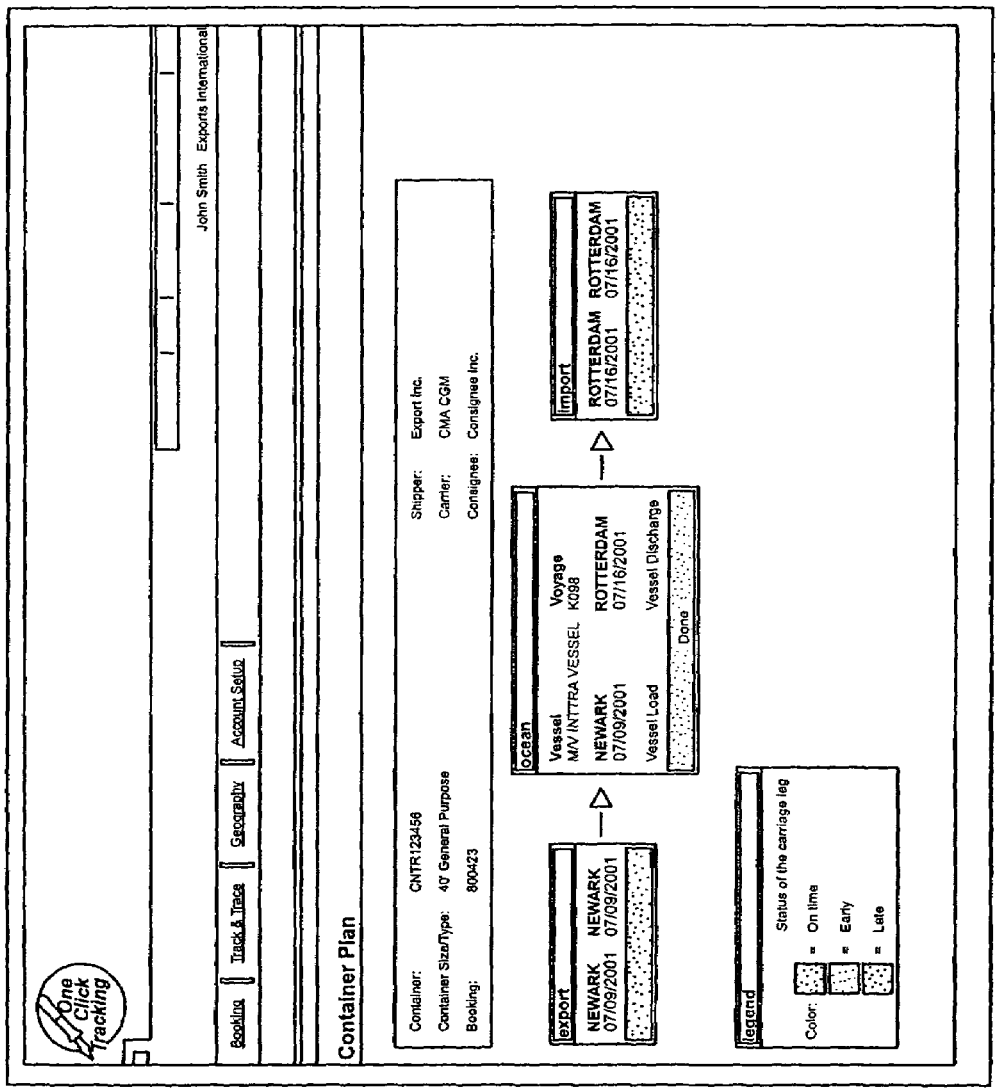

Referring to FIGS. 4a and 12a-12c, by clicking, for example, the track and trace icon 436 of FIG. 4a, the user enables the track and trace search window as shown in FIG. 12a The user enters the specific container data in the field 1201 and, by using the drop-down menu 1202, the user identifies the type of data. The type of data may be any of the following: bill of lading number; container number; booking number; carrier booking number; customer reference number; shipper/consignee number, date ranges for place of receipt, first load port, final discharge port and delivery location; receipt/delivery locations, load/discharge locations, carrier, vessel and voyage number, current container activities/status and the like. The common carrier interface displays the search results screen as shown in FIG. 12b. If desired, the user may view a booking summary by clicking on, for example, the word "details" 1203 or track the containers by clicking on the "Track Container" button 1204 which links the user to the container plan screen shown in FIG. 12c. Furthermore, the user has the option of customizing the booking by clicking the "Customize Booking" button 1205.

Event notification may be submitted to the nominated users using any of the following technologies: EDI, Email, common carrier interface pop-up dialogue box and the like. This may be based on the users technology. Furthermore, the user may define the rules with respect to event notification. Table I below shows an example of the events, event triggers and event notification as determined by the user.

The system may, upon the user demand, automatically generate notices of cargo movement according to the user specification. The event handling functionality may be employed to provide notification regarding the certain track and trace events, track and trace non-events, and certain business process decisions. The event notification component of the common carrier system may reflect the workflow environment whereby interested users are notified when an event has occurred, or when one hasn't (e.g. a shipment was expected on a certain day, but is not expected to arrive until the next day). The user may specify their tolerances for these events. For example, one user may which to know if a shipment is late more than six hours, whereas another is more tolerant and a 24 hour delay and notification is acceptable.

To notify the user when an event has not occurred, the common carrier system polls the booking activity plan information periodically to identify non-conformances against the booking activity plan, that is, when milestone events (that should have occurred) have not. Event messages may contain event code and location information. When the system identifies a non-conformance, an event notification is automatically generated and submitted to nominated entries. A non-confirmation in this case is deemed to be when the system has not received an event message prior to or at the date/time of the event should have occurred as defined in the booking activity plan. The common carrier system also submits track and trace events notifications when certain "optional" events are notified to the system, for example customs held and customs release.

TABLE I

| Events | Event Trigger | Event Source | Event Notification |
|---|---|---|---|
| Empty container pick-up | Empty Container Released by Carrier | Carrier's system or CC System | None |
| Empty container positioned | Arrival of container at Shipper's premises | Carrier's system or CC System | None |
| Departure | Departure of Container from a Location | Carrier's system or CC System | Yes, if not notified to CC System |
| Arrival | Arrival of Container at Location | Carrier's system or CC System | Yes, if not notified to CC System |
| Loaded on Truck | As part of an inland move, container has been loaded onto a Truck | Carrier's system or CC System | None |
| Loaded on Rail | As part of an inland move, container has been loaded onto a train | Carrier's system or CC System | None |
| Loaded on Barge | As part of an inland move, container has been loaded onto a barge | Carrier's system or CC System | None |
| Loaded on Vessel | Container has been loaded onto a vessel | Carrier's system or CC System | None |
| Discharged from Vessel | Container has been unloaded from vessel | Carrier's system or CC System | None |

TABLE I-continued

| Events | Event Trigger | Event Source | Event Notification |
|---|---|---|---|
| Customs Clearance | Container has cleared customs | Carrier's System or nominated agent's system or CC System | Yes |
| Customs Hold | Container has been held at Customs | Carrier's System or nominated agent's system or CC System | Yes |
| Customs Release | Container has been released by Customs after being held | Carrier's System or nominated agent's system or CC System | Yes |
| Cargo Release | Cargo has been released by the Carrier | Carrier's system or CC System | None |
| Free Time to Expire | Containers from time about to expire | Carrier's system or CC System | Yes |
| Free Time Expired | Container free time has expired | Carrier's system or CC System | Yes |

Figure 13:
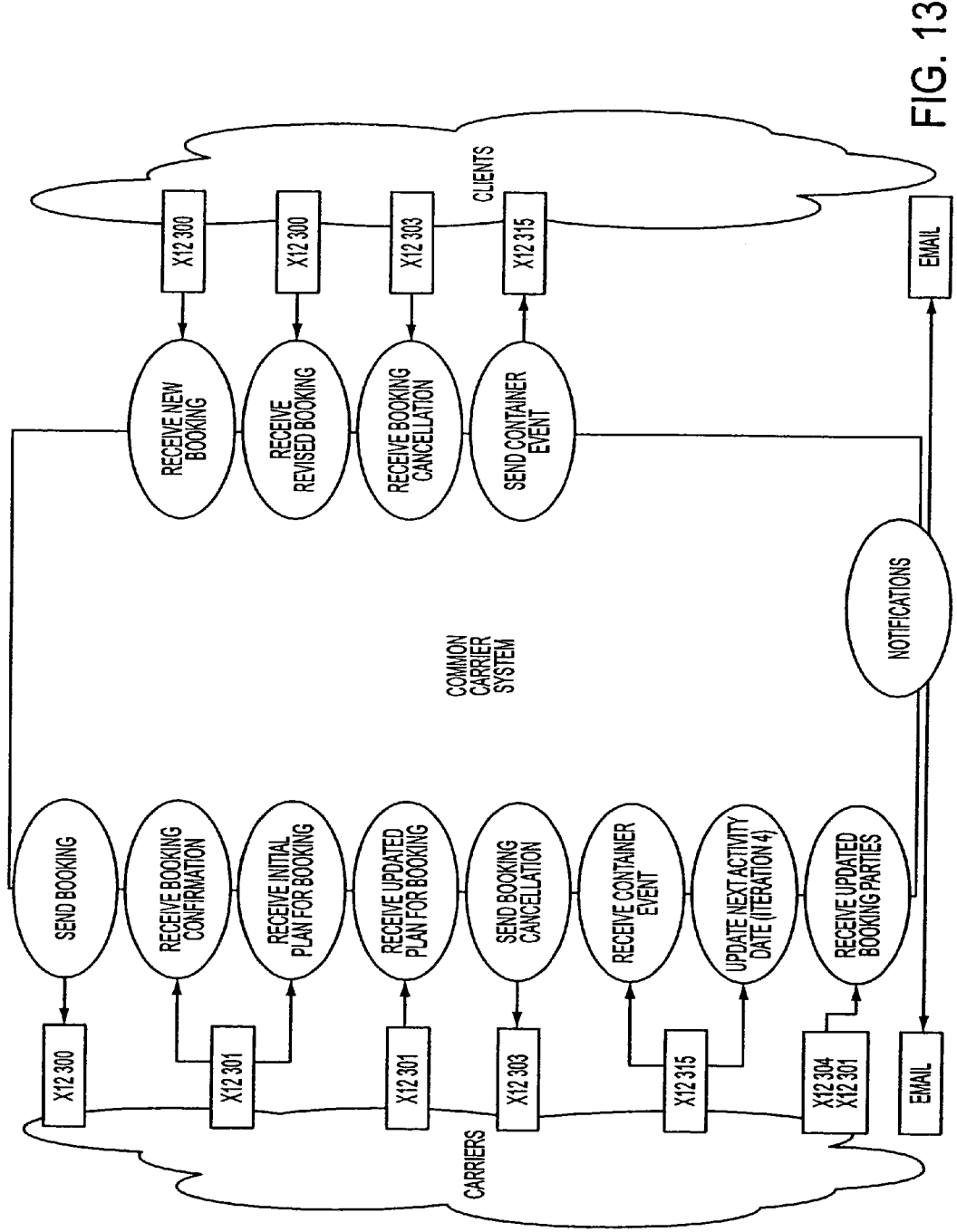
FIG. 13 illustrates an example of the common carrier system according to embodiments of the present invention.

FIG. 13 illustrates the flow of messages sent and received by the common carrier system. EDI may be received in all EDI formats. Carriers may, for example, send 301 document message types to confirm container booking. Carriers may, for example, send document type 315 status events to the common carrier system to update container status. Events may be, for example and without limitation, anything from pick up at shipper, to ocean voyage through customs clearance to ultimate delivery. Carriers may send a range of different messages. Finally, the common carrier system supports but is not limited to EDI, XML, email and the like to send out received messages to the users.

Thus, has been described a system that enables domestic and/or international transportation users to handle shipping transactions through a single common system substantially through a neutral transportation portal. The system provides, among other things, transportation users with single point of entry for tracking cargo movements with multiple carriers. The system also gives users access to scheduling, booking requests for booking cargo across several carriers and proactive event notification. Many variation and alterations of the embodiments are of course possible.

We claim:

1. A computer network comprising:
a customer computer configured to enable a customer to create a first container booking request;
a first carrier computer configured to receive said first container booking request over a first communication pathway and confirm the first container booking request over the first communication pathway, thereby creating a first container booking; and
a shipping coordinator computer including a storage, the shipping coordinator computer configured to periodically receive and store information from said first carrier computer over a second communication pathway relating to said first container booking and other container bookings and to store the received information in the storage,
the shipping coordinator computer further configured to receive from the customer computer a request for information relating to the first container booking, configured to search for a match between the request for information pertaining to the first container booking and the stored information from the first carrier computer, and configured to then provide said stored first container booking information to said customer computer upon receiving the request for said first container booking information, and prior to receiving the next periodic information from said first carrier computer, and
the shipping coordinator computer configured to receive and store the information relating to said first container booking prior to receiving a first request from the customer computer for the information relating to said first container booking.

2. The computer network according to claim 1, wherein said first carrier computer is configured to transmit information relating to said first booking to said shipping coordinator computer by at least one of the Internet and Electronic Data Interchange (EDI).

3. The computer network according to claim 1, wherein said shipping coordinator computer is configured to transmit information relating to said first booking to said customer computer by at least one of the Internet and Electronic Data Interchange (EDI).

4. The computer network according to claim 1, further comprising one or more additional carrier computers, wherein said shipping coordinator computer is configured to receive information from multiple carrier computers and forward the information to said customer computer.

5. The computer network according to claim 1, wherein the shipping coordinator computer is configured to provide the first container booking information to the customer computer over the first communication pathway in response to receiving the request for the first container booking information from the customer computer over the first communication pathway.

6. The computer network according to claim 5, further comprising a second carrier computer configured to receive a second container booking request and configured to confirm the second booking request, thereby creating a second booking,
the shipping coordinator further configured to periodically receive information from said second carrier computer relating to said second container booking over the second communication pathway,
said shipping coordinator computer further configured to receive from the customer computer a request for information relating to the second container booking, configured to search for a match between the request for information pertaining to the second container booking and the stored information from the second carrier computer, and configured to provide said second container booking information to said customer computer in response to receiving the request for said second container booking information and prior to receiving the next periodic information from the second carrier computers.

7. The computer network according to claim 6, wherein the shipping coordinator computer is configured to receive the requests for information relating to the first and second container bookings, determine an appropriate carrier for each of said requests, and forward each information request to the appropriate carrier computer over the second communication pathway.

8. The computer network of claim 6, wherein the customer computer is configured to use the Internet to access information about both the first and second container bookings.

9. The computer network of claim 8, wherein the customer computer is configured to access information about both the first and second container bookings by utilizing a web page associated with the shipping coordinator computer over the first communication pathway.

10. The computer network of claim 8, wherein the customer computer is configured to access information about both the first and second container bookings by accessing an email message delivered by the shipping coordinator computer over the first communication pathway.

11. The computer network of claim 6, wherein the shipping coordinator computer is configured to receive the first container booking information from the first carrier computer over the second communication pathway via electronic communication, and wherein the shipping coordinator computer is configured to receive the second container booking information from the second carrier computer over the second communication pathway via electronic communication.

12. The computer network of claim 11, wherein the shipping coordinator computer is configured to receive the first container booking information from the first carrier computer over the second communication pathway via electronic data interchange (EDI), and wherein the coordinating computer is configured to receive the information about the second container booking from the second computer over the second communication pathway via EDI.

13. A computer network comprising:
a customer computer configured to create a container booking request and configured to forward the container booking request to a shipping coordinator;
a shipping coordinator computer, including a storage, configured to receive said container booking request from said customer computer over a first communication pathway and forward said container booking request to one or more carriers over a second communication pathway; and
one or more carrier computers configured to receive said container booking request from said shipping coordinator computer over the second communication pathway and confirm the container booking request,
said shipping coordinator computer further configured to periodically receive and store status information from the one or more carrier computers over the second communication pathway regarding the container booking request forwarded to the one or more carriers, and other container bookings,
said shipping coordinator computer further configured to receive from the customer computer a request for information relating to the container booking request, configured to search for a match between the request for information pertaining to the first container booking and the stored information from the first carrier computer, and configured to provide said stored status information to said customer computer upon receiving the request for said first container booking information and prior to receiving the next periodic information from the one or more carrier computers, and
the shipping coordinator computer configured to receive and store the information relating to said first container booking prior to receiving a first request from the customer computer for the in format ion relating to said first container booking.

* * * * *

UNITED STATES PATENT AND TRADEMARK OFFICE
CERTIFICATE OF CORRECTION

| | | |
|---|---|---|
| PATENT NO. | : 7,752,142 C1 | Page 1 of 1 |
| APPLICATION NO. | : 90/012121 | |
| DATED | : November 6, 2013 | |
| INVENTOR(S) | : Poul Bjerre, Thomas M. Eskesen and Michael Schutt | |

It is certified that error appears in the above-identified patent and that said Letters Patent is hereby corrected as shown below:

In the Claims,

Claim 14, col. 4, line 19, of the Ex Parte Reexamination Certificate, please delete "*server*" and replace it with -- *shipping coordinator computer* --.

Claim 14, col. 4, line 20, of the Ex Parte Reexamination Certificate, please delete "*server*" and replace it with -- *shipping coordinator computer* --.

Claim 14, col. 4, line 47, of the Ex Parte Reexamination Certificate, please delete "*server*" and replace it with -- *shipping coordinator computer* --.

Claim 15, col. 4, line 65, of the Ex Parte Reexamination Certificate, please delete "*server*" and replace it with -- *shipping coordinator computer* --.

Claim 15, col. 4, line 66, of the Ex Parte Reexamination Certificate, please delete "*server*" and replace it with -- *shipping coordinator computer* --.

Signed and Sealed this
Twelfth Day of August, 2014

Michelle K. Lee
*Deputy Director of the United States Patent and Trademark Office*

US007752142C1

(12) EX PARTE REEXAMINATION CERTIFICATE (9924th)
United States Patent
Bjerre et al.

(10) Number: US 7,752,142 C1
(45) Certificate Issued: *Nov. 6, 2013

(54) COMMON CARRIER SYSTEM

(75) Inventors: Poul Bjerre, Carinaparken (DK);
Thomas M. Eskesen, Sdr. Strandvej (DK); Michael Schutt, Morris Plains, NJ (US)

(73) Assignee: INTTRA, Inc., Parsippany, NJ (US)

Reexamination Request:
No. 90/012,121, Feb. 1, 2012

Reexamination Certificate for:
Patent No.: 7,752,142
Issued: Jul. 6, 2010
Appl. No.: 10/993,354
Filed: Nov. 22, 2004

( * ) Notice: This patent is subject to a terminal disclaimer.

Related U.S. Application Data

(62) Division of application No. 09/973,082, filed on Oct. 10, 2001, now Pat. No. 7,756,794.

(60) Provisional application No. 60/238,454, filed on Oct. 10, 2000.

(51) Int. Cl.
*G06Q 30/00* (2012.01)

(52) U.S. Cl.
USPC .......................................... 705/333; 705/336

(58) Field of Classification Search
None
See application file for complete search history.

(56) References Cited

To view the complete listing of prior art documents cited during the proceeding for Reexamination Control Number 90/012,121, please refer to the USPTO's public Patent Application Information Retrieval (PAIR) system under the Display References tab.

*Primary Examiner* — Simon Ke

(57) ABSTRACT

An on-line system and method for buyers and sellers of international container transportation services is disclosed. Specifically, the system offers importing and exporting customers the opportunity to request and select specific service patterns offered by participating carriers in the booking of full container shipments. The system includes user interfaces that allow a shipper to track and trace containers across multiple carriers and an event notifications system, which notifies the user when an event has or has not occurred.

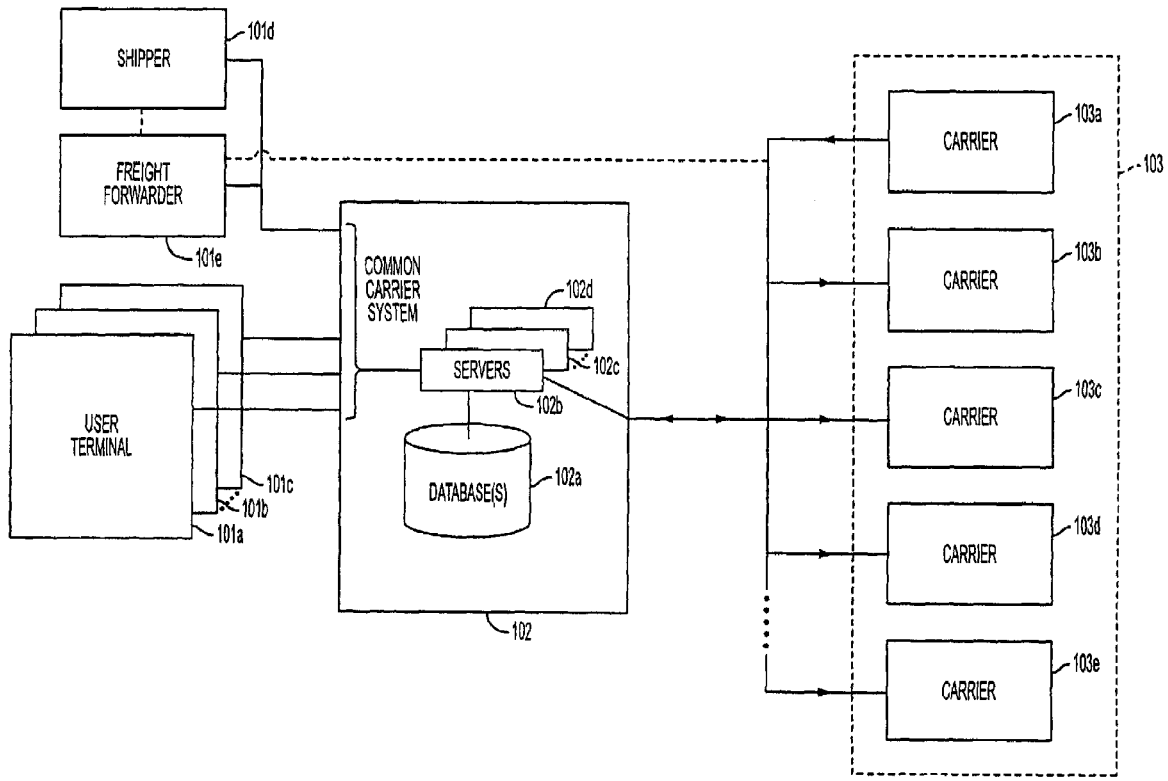

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6-13 are determined to be patentable as amended.

Claims 2-5, dependent on an amended claim, are determined to be patentable.

New claims 14-15 are added and determined to be patentable.

1. A computer network *providing multiple shippers and multiple carriers with a neutral transportation portal for storing and accessing container shipping status information, the network* comprising:
    a *first* customer computer configured to enable a *first* customer to create a first container booking request *relating to a first container*;
    *a second customer computer configured to enable a second customer to create a second container booking request relating to a second container;*
    *wherein said first and second customers are shippers with goods to be transported;*
    a first carrier computer configured to receive said first container booking request over a first communication pathway and confirm the first container booking request over the first communication pathway, thereby creating a first container booking;
    *a second carrier computer configured to receive said second container booking request and confirm the second container booking request, thereby creating a second container booking;* and
    a shipping coordinator computer including a storage, the shipping coordinator computer configured to periodically receive and store information from said first carrier computer over a second communication pathway relating to said first container booking and other container bookings, *and from said second carrier computer relating to said second container booking* and to store the received information in the storage, *said shipping coordinator computer enabling multiple shippers to communicate with multiple carriers through a neutral transportation portal, wherein said shipping coordinator computer is not hosted by either a shipper or a carrier,*
    the shipping coordinator computer further configured to receive from the *first or second* customer computer a request for information relating to the first *or second* container booking, configured to search for a match between the request for information pertaining to the first *or second* container booking and the stored information from the first *or second* carrier computer, and configured to then provide said stored first *or second* container booking information to said *first or second* customer computer upon receiving the request for said first *or second* container booking information, and prior to receiving the next periodic information from said first *or second* carrier computer, and
    the shipping coordinator computer configured to receive and store the information relating to said first *or second* container booking prior to receiving a first request from the *first or second* customer computer for the information relating to said first *or second* container booking
    *wherein providing the information relating to the first or second container booking includes providing stored transit status if the first or second container has not yet been delivered to its final destination and providing stored delivery status if said first or second container has been delivered to its final destination, thereby providing multiple shippers and multiple carriers with a neutral transportation portal for storing and accessing container tracking and tracing information.*

6. The computer network according to claim 5, further comprising a [second] *third* carrier computer configured to receive a [second] *third* container booking request and configured to confirm the [second] *third* booking request, thereby creating a [second] *third* booking,
    the shipping coordinator further configured to periodically receive information from said [second] *third* carrier computer relating to said [second] *third* container booking over the second communication pathway,
    said shipping coordinator computer further configured to receive from the customer computer a request for information relating to the [second] *third* container booking, configured to search for a match between the request for information pertaining to the [second] *third* container booking and the stored information from the [second] *third* carrier computer, and configured to provide said [second] *third* container booking information to said customer computer in response to receiving the request for said [second] *third* container booking information and prior to receiving the next periodic information from the [second] *third* carrier computers.

7. The computer network according to claim 6, wherein the shipping coordinator computer is configured to receive the requests for information relating to the first [and second], *second, and third* container bookings, determine an appropriate carrier for each of said requests, and forward each information request to the appropriate carrier computer over the second communication pathway.

8. The computer network of claim 6, wherein the customer computer is configured to use the Internet to access information about both the first [and second], *second, and third* container bookings.

9. The computer network of claim 8, wherein the customer computer is configured to access information about both the first [and second], *second, and third* container bookings by utilizing a web page associated with the shipping coordinator computer over the first communication pathway.

10. The computer network of claim 8, wherein the customer computer is configured to access information about both the first [and second], *second, and third* container bookings by accessing an email message delivered by the shipping coordinator computer over the first communication pathway.

11. The computer network of claim 6, wherein the shipping coordinator computer is configured to receive the first container booking information from the first carrier computer over the second communication pathway via electronic communication, and wherein the shipping coordinator computer is configured to receive the [second] *third* container booking information from the [second] *third* carrier computer over the second communication pathway via electronic communication.

12. The computer network of claim 11, wherein the shipping coordinator computer is configured to receive the first container booking information from the first carrier computer over the second communication pathway via electronic data interchange (EDI), and wherein the coordinating computer is configured to receive the information about the [second] *third* container booking from the [second] *third* computer over the second communication pathway via EDI.

13. A computer network *providing multiple shippers and multiple carriers with a neutral transportation portal for storing and accessing container shipping status information,* the network comprising:

a *first* customer computer configured to create a *first* container booking request *relating to a first container* and configured to forward the *first* container booking request to a shipping coordinator;

a *second customer computer configured to create a second container booking request relating to a second container and configured to forward the second container booking request to a shipping coordinator;*

*wherein said first and second customers are shippers with goods to be transported;* a shipping coordinator computer, including a storage, configured to receive said container booking request from said customer [computer] *computers* over a first communication pathway and forward said container booking request to [one] *two* or more carriers over a second communication pathway; and

[one or more] *a first* carrier [computers] *computer* configured to receive said *first* container booking request from said shipping coordinator computer over the second communication pathway and confirm the *first* container booking request,

*a second carrier computer configured to receive said second container booking request from said shipping coordinator computer and confirm the second container booking request,* said shipping coordinator computer further configured to periodically receive and store status information from the [one or more] *first* carrier [computers] *computer* over the second communication pathway regarding the *first* container booking request forwarded to the [one or more carriers] *first* carrier, and other container bookings, *and from said second carrier computer regarding the second container booking request forwarded to the second carrier;* said shipping coordinator computer further configured to receive from the *first or second* customer computer a request for information relating to the *first or second* container booking request, configured to search for a match between the request for information pertaining to the first *or second* container booking and the stored information from the first *or second* carrier computer, and configured to provide said stored status information to said *first or second* customer computer upon receiving the request for said first *or second* container booking information and prior to receiving the next periodic information from the [one or more] *first or second* carrier computers, and the shipping coordinator computer configured to receive and store the information relating to said first *or second* container booking prior to receiving a first request from the *first or second* customer computer for the information relating to said first container booking wherein providing the information relating to the first or second container booking includes providing stored transit status if the first or second container has not yet been delivered to its final destination and providing stored delivery status if said first or second container has been delivered to its final destination, thereby providing multiple shippers and multiple carriers with a neutral transportation portal for storing and accessing container tracking and tracing information.

14. *A computer network providing multiple shippers and multiple carriers with a neutral transportation portal for storing and accessing container shipping status information,* the network comprising:

a shipping coordinator computer, said shipping coordinator computer including a storage, and configured to receive information from two or more carrier computers each associated with at least one carrier entity and to provide a common carrier interface, said common carrier interface enabling multiple shippers to communicate with multiple carrier entities through a neutral transportation portal, wherein said server is not hosted by either a shipper or a carrier entity, said server further configured to permit the following:

receive a container booking request from a customer computer and forward said container booking request to one or more carrier computers, said customer computer associated with a customer who is a shipper with goods to be transported;

receive a response from the one or more carrier computers confirming said container booking request;

periodically receive and store status information from the one or more carrier computers regarding the container booking request forwarded to the one or more carrier computers, and other container bookings;

receive from said customer computer a request for information relating to said container booking request, search for a match between the request for information pertaining to said container booking and the stored information from one or more carrier computers, and provide said stored status information to said customer computer, prior to receiving the next periodic information from the one or more carrier computers; and receive and store the information relating to said container booking prior to receiving a first request from the customer computer for the information relating to said container booking wherein the server is further configured such that the provided stored status information includes transit status if said container has not yet been delivered to its final destination and stored delivery status if said container has been delivered to its final destination, thereby providing multiple shippers and multiple carriers with a neutral transportation portal for storing and accessing container tracking and tracing information.

15. *A method, performed by a shipping coordinator computer including a storage, for coordinating container bookings,* said shipping coordinator computer configured to receive information from two or more carrier computers each associated with at least one carrier entity and to provide a common carrier interface, said common carrier interface enabling multiple shippers to communicate with multiple carrier entities through a neutral transportation portal, wherein said server is not hosted by either a shipper or a carrier entity, said server further configured to permit the following, the method comprising:

receiving a container booking request from a first customer computer, said first customer computer associated with a first customer who is a shipper with goods to be transported;

receiving a container booking request from a second customer computer, said second customer computer associated with a second customer who is a shipper with goods to be transported;

forwarding said first container booking request to a first carrier computer and said second container booking request to a second carrier computer;

receiving a response from the first carrier computer confirming said first container booking request and from the second carrier computer confirming said second container booking request;

periodically receiving and storing status information from the first carrier computer regarding the first container booking request forwarded to the first carrier computers, and other container bookings, and from the second carrier computer regarding the second container booking request;

receiving from said first or second customer computer a request for information relating to said first or second container booking request, searching for a match between the request for information pertaining to said first or second container booking and the stored status information from the first or second carrier computers, and providing said stored status information to said first or second customer computer upon receiving the request for said first or second container booking information and prior to receiving the next periodic status information from the first or second carrier computer; and receiving and storing the status information relating to said first or second container booking prior to receiving the request from the first or second customer computer for the information relating to said first or second container booking wherein providing the stored status information relating to the first or second container booking includes providing stored transit status if the first or second container has not yet been delivered to its final destination and providing stored delivery status if said first or second container has been delivered to its final destination, thereby providing multiple shippers and multiple carriers with a neutral transportation portal for storing and accessing container tracking and tracing information.

\* \* \* \* \*